US010212785B2

(12) United States Patent
Ansari et al.

(10) Patent No.: US 10,212,785 B2
(45) Date of Patent: *Feb. 19, 2019

(54) STAGGERED ARRAY OF INDIVIDUALLY ADDRESSABLE LIGHT-EMITTING ELEMENTS FOR SWEEPING OUT AN ANGULAR RANGE

(71) Applicant: Google LLC, Mountain View, CA (US)

(72) Inventors: Sameer Ansari, San Francisco, CA (US); Roman Lewkow, San Jose, CA (US); Jason Holt, Mountain View, CA (US)

(73) Assignee: Google LLC, Mountain View, CA (US)

( * ) Notice: Subject to any disclaimer, the term of this patent is extended or adjusted under 35 U.S.C. 154(b) by 367 days.

This patent is subject to a terminal disclaimer.

(21) Appl. No.: 15/180,977

(22) Filed: Jun. 13, 2016

(65) Prior Publication Data
US 2017/0359883 A1    Dec. 14, 2017

(51) Int. Cl.
*H05B 37/02* (2006.01)
*F21V 5/04* (2006.01)
(Continued)

(52) U.S. Cl.
CPC ......... *H05B 37/0227* (2013.01); *F21V 5/043* (2013.01); *F21V 23/005* (2013.01);
(Continued)

(58) Field of Classification Search
CPC ..... F21V 5/043; F21V 23/005; H05B 37/029; H05B 37/0227; H05B 37/0281;
(Continued)

(56) References Cited

U.S. PATENT DOCUMENTS 3,940,609 A    2/1976    Johnstun
4,474,422 A    10/1984   Kitamura
(Continued)

FOREIGN PATENT DOCUMENTS

EP    0887192 A1    12/1998

OTHER PUBLICATIONS

Mautz, et al.; Survey of Optical Indoor Positioning Systems; 2011 International Conference on Indoor Positioning and Indoor Navigation (IPIN); Sep. 21-23, 2011; IEEE.
(Continued)

*Primary Examiner* — Que T Le
(74) *Attorney, Agent, or Firm* — McDonnell Boehnen Hulbert & Berghoff LLP

(57) ABSTRACT

The present disclosure relates to staggered arrays of individually addressable light-emitting elements for sweeping out angular ranges. One example device includes an astigmatic optical element. The device may also include an array of individually addressable light-emitting elements arranged to emit light towards the astigmatic optical element. The astigmatic optical element may be arranged to focus light emitted from each individually addressable light-emitting element to produce a substantially linear illumination pattern at a different corresponding scan angle within an angular range. The example device may further include a control system operable to sequentially activate the individually addressable light-emitting elements such that the substantially linear illumination pattern sweeps out the angular range. The individually addressable light-emitting elements may be staggered with respect to one another in the array such that the substantially linear illumination pattern sweeps out the angular range continuously.

20 Claims, 11 Drawing Sheets

(51) Int. Cl.
*F21V 23/00* (2015.01)
*G01S 7/48* (2006.01)
*G01S 7/481* (2006.01)
*G06F 3/03* (2006.01)
*H05B 33/08* (2006.01)
*F21Y 101/02* (2006.01)

(52) U.S. Cl.
CPC .......... *G01S 7/4808* (2013.01); *G01S 7/4817* (2013.01); *G06F 3/0325* (2013.01); *H05B 33/0845* (2013.01); *H05B 37/029* (2013.01); *H05B 37/0281* (2013.01); *F21Y 2101/02* (2013.01)

(58) Field of Classification Search
CPC ...... G01S 7/4817; G01S 17/06; G01S 7/4815; G06F 3/0325
USPC .................................................. 250/221, 216
See application file for complete search history.

(56) References Cited

U.S. PATENT DOCUMENTS

| | | | |
|---|---|---|---|
| 4,847,734 A | 7/1989 | Katoh | |
| 4,901,207 A | 2/1990 | Sato et al. | |
| 5,412,634 A | 5/1995 | Büchler et al. | |
| 5,838,024 A | 11/1998 | Masuda et al. | |
| 6,087,645 A | 7/2000 | Kitajima et al. | |
| 6,455,931 B1 | 9/2002 | Hamilton, Jr. et al. | |
| 6,556,349 B2 | 4/2003 | Cox et al. | |
| 6,570,324 B1 | 5/2003 | Tutt et al. | |
| 6,627,865 B1 | 9/2003 | Hamilton, Jr. et al. | |
| 6,637,921 B2 | 10/2003 | Coushaine | |
| 6,712,471 B1 | 3/2004 | Travis et al. | |
| 6,778,257 B2 | 8/2004 | Bleeker et al. | |
| 7,731,395 B2 | 6/2010 | Parkyn et al. | |
| 9,250,040 B1 | 2/2016 | Bird et al. | |
| 9,909,862 B2 * | 3/2018 | Ansari | G01B 11/26 |
| 2007/0081168 A1 | 4/2007 | Johnston | |
| 2009/0122272 A1 | 5/2009 | Silverstein et al. | |
| 2014/0071427 A1 | 3/2014 | Last | |
| 2015/0055117 A1 | 2/2015 | Pennecot et al. | |
| 2016/0006914 A1 | 1/2016 | Neumann | |
| 2018/0143012 A1 * | 5/2018 | Ansari | G01B 11/26 |

OTHER PUBLICATIONS

Xiao, et al.; Lumitrack: Low Cost, High Precision, High Speed Tracking with Projected m-Sequences; Proceedings of the 26th annual ACM symposium on User interface software and technoiogy; 2013; ACM.

Herrnsdorf, et al.; Concept of a GaN-LED-based positioning system using structured illumination; 2015 IEEE Photonics Conference, IPC 2015; Nov. 9, 2015; IEEE.

Ultra Slim Projection Optics for Structured Illumination; Fraunhofer Institute for Applied Optics and Precision Engineering IOF; http://www.iof.fraunhofer.de/content/dam/iof/en/documents/pb/ultra-slim-projection-optics-e.pdf; retrieved on Jun. 10, 2016.

Raskar, et al.; Prakash: Lighting Aware Motion Capture using Photosensing Markers and Multiplexed Illuminators; ACM Transactions on Graphics, vol. 26, No. 3, Article 36, Publication date: Jul. 2007; ACM.

U.S. Appl. No. 15/181,370, filed Jun. 13, 2016; inventors: Sameer Ansari, Roman Lewkow, Jason Holt.

YouTube video titled "HTC Vive Lighthouse Chaperone tracking system Explained"; published Aug. 24, 2015; URL: https://www.youtube.com/watch?v=J54dotTt7k0; screenshots included.

HTC Vive Homepage; URL: http://www.htcvive.com/us/; archived on Jun. 2, 2016; retrieved from https://web.archive.org/web/20160602080204/http://www.htcvive.com/us/.

PCT International Search Report and Written Opinion, PCT International Application No. PCT/EP2017/015162, dated Apr. 5, 2017, 18 pages.

PCT International Search Report and Written Opinion, PCT International Application No. PCT/EP2017/015157, dated Mar. 30, 2017, 17 pages.

* cited by examiner

STAGGERED ARRAY OF INDIVIDUALLY ADDRESSABLE LIGHT-EMITTING ELEMENTS FOR SWEEPING OUT AN ANGULAR RANGE

BACKGROUND

A variety of techniques exist to map the geometry of an environment and objects within the environment and/or to determine the location of objects of interest within the environment. These methods can include applying one or more patterns of illumination to the environment (e.g., an array of vertical and/or horizontal lines of illumination) and imaging the environment, using one or more cameras, when exposed to such illumination. Additionally or alternatively, a particular object within the environment could include a tag configured to detect the emitted illumination. The location of the tag could be determined based on the detected illumination. In a further example, a particular object within the environment could include a tag configured to emit illumination and/or to reflect illumination. The location of the tag could be determined by imaging the environment with one or more cameras.

SUMMARY

The specification and drawings disclose embodiments that relate to a staggered array of light-emitting elements for sweeping out an angular range. An object within the angular range, equipped with a light detecting device, could identify its location relative to the array of light-emitting elements based on a time associated with a detected illumination.

In one aspect the disclosure describes a device. The device includes an astigmatic optical element. The device also includes an array of individually addressable light-emitting elements arranged to emit light towards the astigmatic optical element. The astigmatic optical element is arranged to focus light emitted from each individually addressable light-emitting element to produce a substantially linear illumination pattern at a different corresponding scan angle within an angular range. The device further includes a control system operable to sequentially activate the individually addressable light-emitting elements such that the substantially linear illumination pattern sweeps out the angular range. The individually addressable light-emitting elements are staggered with respect to one another in the array such that the substantially linear illumination pattern sweeps out the angular range contiguously.

In another aspect the disclosure describes a method. The method includes emitting light from a first individually addressable light-emitting element toward an astigmatic optical element. The method also includes focusing, by the astigmatic optical element, the light emitted from the first individually addressable light-emitting element to produce a substantially linear illumination pattern at a first corresponding scan angle within an angular range. The method further includes emitting light from a second individually addressable light-emitting element toward the astigmatic optical element. Additionally, the method includes focusing, by the astigmatic optical element, the light emitted from the second individually addressable light-emitting element to reproduce the substantially linear illumination pattern at a second corresponding scan angle within the angular range. The first and second individually addressable light-emitting elements are in an array of individually addressable light-emitting elements. The first and second individually addressable light-emitting elements are sequentially activated by a control system such that the substantially linear illumination pattern sweeps out at least a portion of the angular range. The first and second individually addressable light-emitting elements are staggered with respect to one another in the array such that the substantially linear illumination pattern sweeps out the angular range continuously.

In a third aspect the disclosure describes a system. The system includes a light-emitting device. The light-emitting device includes an astigmatic optical element. The light-emitting device also includes an array of individually addressable light-emitting elements arranged to emit light towards the astigmatic optical element. The astigmatic optical element is arranged to focus light emitted from each individually addressable light-emitting element to produce a substantially linear illumination pattern at a different corresponding scan angle within an angular range. The light-emitting device further includes a control system operable to sequentially activate the individually addressable light-emitting elements such that the substantially linear illumination pattern sweeps out the angular range. The individually addressable light-emitting elements are staggered with respect to one another in the array such that the substantially linear illumination pattern sweeps out the angular range contiguously. Additionally, the system includes a light detector. The light detector is configured to detect light emitted from the light-emitting device.

These as well as other aspects, advantages, and alternatives, will become apparent to those of ordinary skill in the art by reading the following detailed description, with reference where appropriate to the accompanying drawings.

DETAILED DESCRIPTION

Figure 1:
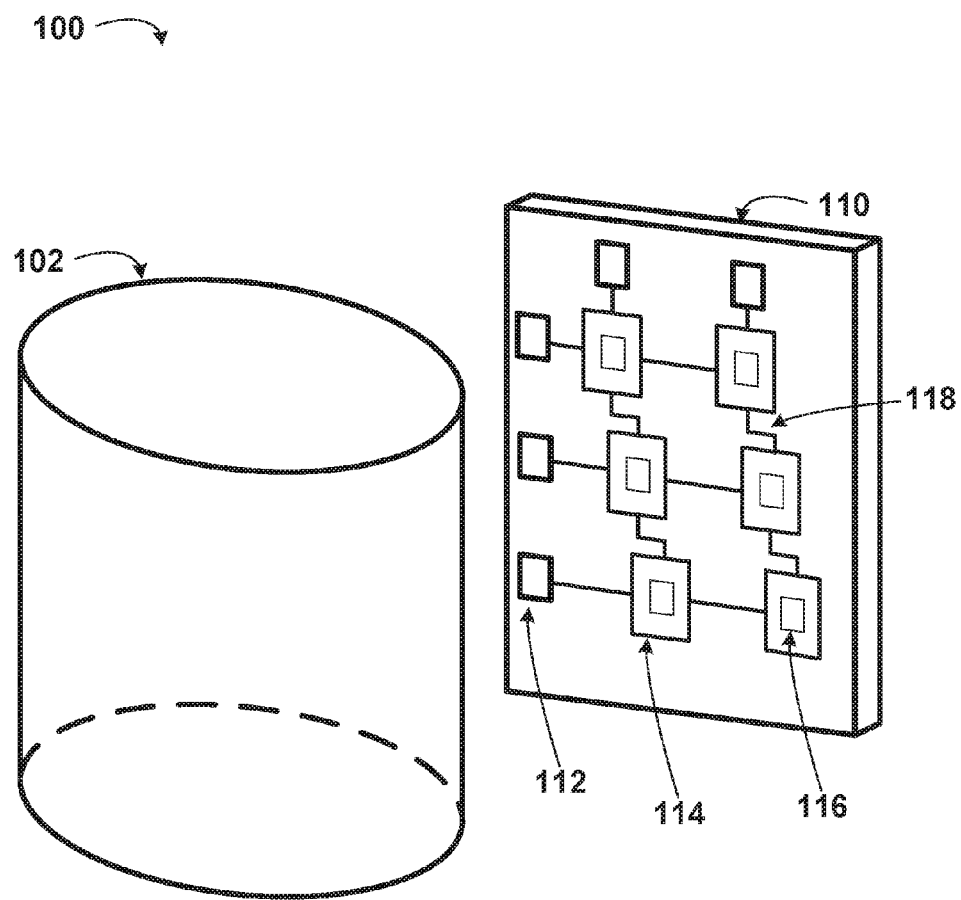
FIG. 1 is a perspective view of an array of individually addressable light-emitting elements and an astigmatic optical element, according to example embodiments.

In the following detailed description, reference is made to the accompanying figures, which form a part hereof. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

I. OVERVIEW

The location of objects in an environment can be determined by illuminating the environment with a plurality of different patterns of illumination over time. The patterns of illumination could be specified such that different regions within the environment are exposed to different time-varying waveforms of light intensity. Time-varying waveforms of light intensity are illumination patterns (e.g., a substantially linear illumination pattern) that are modulated in time (e.g., by a light emitter). The location of an object in the environment could then be determined by detecting a time-varying waveform of light intensity received at one or more locations on the object and associating such detected waveforms with respective regions within the environment. For example, a light sensor disposed on an object of interest could detect a time-varying waveform of light intensity incident on the object and the location of the object (e.g., a location or angle of the object relative to one or more light emitters that are emitting different patterns of illumination over time) could then be determined based on the detected time-varying waveform of light intensity.

Such a light emitter could emit different patterns of illumination that vary across a first range of angles in a first direction relative to the light emitter. The emitted patterns of illumination could serve to encode different regions of an environment with respect to the angle relative to the light emitter. For example, the light emitter could include an array of a plurality (e.g., thirty-two) of arranged, individually addressable light-emitting elements (e.g., light emitting diodes LEDs or vertical-cavity surface-emitting lasers VCSELs) and an astigmatic optical element (e.g., a cylindrical lens). The astigmatic optical element may focus light emitted by one of the individually addressable light-emitting elements to produce a substantially linear illumination pattern. Further, the substantially linear illumination pattern focused from each individually addressable light-emitting element could be projected at a different corresponding angle, or corresponding range of angles, within a first angular range. The individually addressable light-emitting elements may thus be sequentially activated (e.g., by a control system) to sweep out the first angular range. The number of individually addressable light-emitting elements within the array could contribute to the width and/or resolution of the first angular range, for example. A tag or other device in the environment could detect the light received at a particular point in the environment over time and a time-varying waveform of such detected illumination could be used to determine the angle of the tag relative to the light emitter. Such information could be used to determine the location, in one dimension or direction, of the tag relative to the light emitter and/or relative to the environment illuminated by the light emitter.

For example, the tag or other device that detects the light received from the light emitter could be configured to detect a synchronization pulse from the light emitter. The synchronization pulse may be provided by illuminating all of the individually addressable light-emitting elements simultaneously, thereby illuminating the entire area within the first angular range. The tag could then detect when the substantially linear illumination pattern that corresponds to the angular position of the tag illuminates the tag (e.g., as the light emitter sequentially illuminates the environment with substantially linear illumination patterns). The time interval between the synchronization pulse and the corresponding substantially linear illumination pattern could be used by the tag to determine the relative angular position of the tag. As an alternative, the individually addressable light-emitting elements could be activated sequentially to sweep out the angular range in a dual-scan fashion (e.g., the angular range is swept out from 0 to 90 degrees and from 90 to 0 degrees over the same time interval). Based on a modulation of the light emitted from the individually addressable light-emitting elements (e.g., the individually addressable light-emitting elements are activated at a rate of 400 kHz for the increasing illumination angles and are activated at a rate of 700 kHz for the decreasing illumination angles), and the relative time interval between the two corresponding substantially linear illumination patterns, as measured by the tag, the first angular position relative to the light emitter can be determined by the tag. Additionally, as the individually addressable light-emitting elements may produce Gaussian or Semi-Gaussian illumination profiles for the substantially linear illumination patterns, the width of such a profile, which could indicate the divergence of the illumination pattern, could be used by the tag to determine the distance of the tag from the light emitter.

The light emitter could further include an additional astigmatic optical element and an additional corresponding array of individually addressable light-emitting elements. These additional elements could be disposed such that the substantially linear illumination pattern produced by the additional astigmatic optical element and the additional corresponding array of individually addressable light-emitting elements is substantially orthogonal to the first array of optical elements (e.g., such that the second array sweeps in a second direction that is rotated from the first direction by between 80 degrees and 100 degrees). These additional elements could thus sweep out a second angular range that is substantially orthogonal to the first angular range (e.g., the first angular range varies from left to right and the second angular range varies from top to bottom with respect to the environment). Similarly, a tag or other device in the environment could detect the light received from the additional array and astigmatic optical element of the light emitter at a particular point in the environment over time. The corresponding time-varying waveform of such detected illumination could be used to determine the angle, relative to the light emitter in the second direction, of the tag. Such information could be used to determine the angular position, in a second dimension or direction, of the tag relative to the light emitter and/or relative to the environment illuminated by the light emitter.

The astigmatic optical element could include an aspheric cylindrical lens or other optical component(s). The astigmatic optical element may be positioned relative to the array of individually addressable light-emitting elements such that the location of a particular individually addressable light-emitting element corresponds to a specific angle, or set of angles, within the angular range relative to the light emitter. Alternatively, one or more of the patterns of illumination emitted from the light emitter (e.g., substantially linear illumination patterns) may correspond to a plurality of individually addressable light-emitting elements within the array.

The light emitter may be more energy efficient than other light emitter designs by only generating light that is used to illuminate an environment of interest. For example, such a light emitter design does not generate and discard light for non-illuminated regions of the environment (e.g., by discarding light to a light dump using a micromirror device). Further, such a light emitter may be relatively small, as it does not require masks, light dumps, or other elements beyond the array and astigmatic optical element. The individually addressable light-emitting elements within the array may be operated by applying current via interconnects (e.g., on a circuit board) to generate respective different patterns of illumination from such a light emitter.

Multiple such light emitters may be provided, e.g., to provide different patterns of illumination over time such that the angle and/or location of a tag or other light-sensitive device in an environment may be determined with respect to two or more angles and/or directions. For example, one light emitter could provide one type of illumination pattern from a particular location that encodes regions of an environment in one direction. Then, another light emitter could provide a different type of illumination pattern from the same location that encodes regions of the environment in another orthogonal direction. A light detector within the environment could detect time-varying waveforms of light received from the first and second light emitters and use such detected waveforms of light to determine the angle of the light detector relative to the light emitter.

Additionally or alternatively, multiple light emitters could be located at two or more different locations. The location of a light detector in an environment, relative to the two or more different locations, could be determined from time-varying waveforms of light emitted by the light emitters when detected by the light detector (e.g., using triangulation). A light detector receiving time-varying waveforms of illumination from two or more light emitters could include the light emitters emitting illumination during respective different, non-overlapping periods of time (e.g., using a method of time division multiplexing), the light emitters emitting light having different wavelengths (e.g., using a method of wavelength multiplexing), the light emitters emitting light at different carrier frequency rates, or the light emitters emitting light that is distinguishable, by a light detector, by some other method.

The individually addressable light-emitting elements within each array could be staggered with respect to one another. This staggered arrangement may be such that the corresponding angles at which the substantially linear illumination patterns are projected relative to the light emitter are adjacent to one another. In this way, the angular ranges swept out by the light emitters may be sweep out contiguously. Therefore, there may be no angles, within the angular ranges, at which a tag or other device could be located that would not be scanned by at least one of the substantially linear illumination patterns projected by the light emitter.

The staggering of the individually addressable light-emitting elements in the array could be necessary to properly align the projecting surfaces of the individually addressable light-emitting elements if the projecting surfaces are smaller than the package size of the individually addressable light-emitting elements (e.g., 0402 LEDs). Further, the astigmatic optical element (e.g., cylindrical lens) can be configured to concentrate the light emitted from the individually addressable light-emitting elements such that the light is spread in a first direction while being focused in a second direction that is orthogonal to the first direction (e.g., to produce a substantially linear illumination pattern). Consequently, the individually addressable light-emitting elements within the array could be arrayed in multiple staggered columns and/or staggered rows, rather than a single staggered column or staggered row. This could save space within a die or on a circuit board, for example.

It should be understood that the above embodiments, and other embodiments described herein, are provided for explanatory purposes, and are not intended to be limiting.

II. EXAMPLE LIGHT EMITTERS AND LIGHT EMITTING SYSTEMS

It can be beneficial in a variety of applications to detect and/or determine the location of an object in an environment. These applications can include tracking the location of a drone, a ball used in a game, a conductor's baton, a controller, a body part of a person (e.g., for motion capture or gesture recognition), or some object(s). In an example application, the angular position of a plurality of markers or tags disposed on respective different locations on a person's body could be determined and used to detect the location and/or motions of the person and/or of particular parts of the person's body. In another example application, the angular position of a control wand or other device, relative to a head-mounted device or other device worn by a person, could be detected and used as an input to the head-mounted device or other system. In yet another example application, the angular position of a drone, robot, or other mobile system within an environment of interest (e.g., a room of a house, a warehouse, or a factory) could be determined and used to control the motion of the drone, robot, or other mobile system within the environment.

Determining the location of an object in an environment can include determining an absolute location of the object (e.g., relative to a defined coordinate system within the environment) and/or determining the location of the object relative to one or more other objects (e.g., relative to another object whose absolute or relative location is being determined, relative to a camera used to generate data used to determine the location of the object, relative to a light emitter used to illuminate the object). Determining the location of an object could include determining a location (e.g., a displacement) of the object and/or determining an angle of the object relative to a defined coordinate system within the environment. The angle of the object could also be determined relative to the location and/or orientation of some other object or device in the environment (e.g., relative to a camera, relative to a light emitter, relative to a person and/or a person's gaze direction).

The location of an object within an environment could be determined via a variety of methods. In some examples, the location of the object could be determined by illuminating the object (e.g., with illumination having a pattern of light that is specified over time and/or space) and/or receiving light from the object (e.g., imaging the environment that includes the object using a camera). The object could include a tag that is configured to emit light (e.g., a tag that is configured to emit a time-coded pattern of light to identify the tag) and/or to reflect light from a light emitter to a light detector (e.g., a tag that includes retroreflective material) to facilitate optical determination of the location of the object. Additionally or alternatively, the object could include a tag that is configured to detect light received by the object. A pattern over time of the intensity of such detected light, or some other property of the detected light, could be used to determine the location of the object.

Such an arrangement may include one or more light emitters illuminating the environment with patterns of illumination that are specified over time and/or space such that different regions of the environment are illuminated by different patterns of illumination over time. Thus, the pattern of illumination detected over time by a light detector on an object could be used to determine the region of the environment within which the object is located. Producing such patterns of illumination could include scanning one or more shaped beams of light across the environment, providing a plurality of different patterns of light to the environment over time, or providing illumination to an environment in some other way. The provided illumination could vary according to an angle relative to a light emitter (e.g., an angle in one or more directions relative to the light emitter) such that a detected intensity of the illumination over time could be used to determine the angle of a light detector (in one or more directions) relative to the light emitter.

In a particular example, a light emitter could be configured to provide a plurality of substantially linear illumination patterns during respective different periods of time. Each of the substantially linear illumination patterns could provide light to the environment at a corresponding angle, or corresponding set of angles, across a first range of angles in a first direction. Thus, as the different substantially linear illumination patterns are produced by the light emitter over time, different regions of the environment can receive respective different time-varying patterns of intensity of the emitted illumination. As each of the substantially linear illumination patterns varies with respect to angle in the first direction within the first range of angles, the time-varying patterns of illumination intensity received by a particular region of the environment, which is located within the first ranges of angles in the first direction relative to the light emitter, can be used to determine the angle of the particular region, in the first direction, relative to the light emitter.

FIG. 1 is a perspective view of an array of individually addressable light-emitting elements and an astigmatic optical element, according to example embodiments. The individually addressable light-emitting elements 114 each have a projecting surface 116. The individually addressable light-emitting elements 114 may be connected to electrical pads 112 via electrical interconnects 118 on a circuit board 110, for example. The astigmatic optical element may be a cylindrical lens 102 that refracts light emitted by the individually addressable light-emitting elements 114, in certain embodiments. Together, the cylindrical lens 102 and the array of individually addressable light-emitting elements 114 on the circuit board 110 comprise a light emitter 100.

The light emitter 100 could be configured and/or operated in a variety of ways to produce, during respective periods of time, patterns of illumination as described herein. In a particular example, the individually addressable light-emitting elements 114 could be disposed on the circuit board 110 in an array formation (as depicted in FIG. 1). The circuit board 110 may then be disposed relative to the cylindrical lens 102 such that, when a particular addressable light-emitting element 114, or a set of individually addressable light-emitting elements 114, is operated to emit light, the light emitter produces a respective pattern of illumination as described herein (e.g., a substantially linear illumination pattern). The location, on the circuit board 110 relative to the cylindrical lens 102, of the individually addressable light-emitting elements 114 of a particular set of individually addressable light-emitting elements 114 could be specified to control the pattern of illumination emitted by the particular set of individually addressable light-emitting elements 114.

The duration of the periods of time during which the light emitter 100 produces each substantially linear illumination pattern, and the rate at which a sequence of such different substantially linear illumination patterns is repeated, could be specified to facilitate the determination of the angular position of a light detector or other object at more than a specified rate. For example, a sequence of substantially linear illumination patterns from the light emitter 100 could be repeated at a rate greater than 10 Hertz. In the example embodiment of FIG. 1, wherein six or more different substantially linear illumination patterns are produced during each repetition of such a sequence (e.g., to provide six different illuminated environmental locations for the determination of the angular position of the light detector or other object in the first direction relative to the light emitter 100) with the six different individually addressable light-emitting elements 114, each pattern of illumination could be provided during respective time periods that are less than 16.7 milliseconds in duration.

The illustrated light emitter 100 for producing substantially linear illumination patterns can have a number of benefits relative to other apparatuses for generating such patterns of illumination. The energy efficiency of generating patterns of illumination using a light emitter as described herein can be greater than other methods of generating such patterns of illumination (e.g., by absorbing or otherwise blocking a portion of an emitting light using a mask, by reflecting, by a digital micromirror device, a specified portion of light produced by a light source to be absorbed by a light sink or other element). Further, by forming the individually addressable light-emitting elements 114 on the circuit board 110, an alignment between different sets of the individually addressable light-emitting elements 114 can be precisely controlled. This could allow for increased alignment between features (e.g., ranges of angles) of different produced patterns of illumination (e.g., substantially linear illumination patterns) that correspond to the respective different sets of individually addressable light-emitting elements 114. Still further, incorporating the individually addressable light-emitting elements into a single die that is adhered to or otherwise disposed relative to an astigmatic optical element can provide a light-emitting device that has a small size relative, for example, to other light-emitting apparatuses that include multiple masks, light-emitting elements, or other optical elements, or other means for producing patterns of illumination as described herein. By connecting the individually addressable light-emitting elements 114, via the electrical interconnects 118, into a number of sets of individually addressable light-emitting elements 114 that correspond to respective emitted patterns of illumination, the different patterns of illumination can be produced without the use of electronic switches (e.g., transistors) being present on the circuit board 110. Additional advantages of the apparatuses for generating patterns of illumination described herein will be apparent.

The illustrated locations and sizes of the individually addressable light-emitting elements 114 on the circuit board 110, their interconnection with each other and with the electrical pads 112 by the electrical interconnects 118, and other details of the light emitter 100 illustrated in FIG. 1 are intended as non-limiting, illustrative embodiments of the methods and apparatus described herein. Different locations of individually addressable light-emitting elements on a circuit board, corresponding to different patterns of emitted illumination, are anticipated by the inventors. Further, different interconnections of sets of individually addressable light-emitting elements and electrical pads of a circuit board may be used. For example, first and second sets of individually addressable light-emitting elements could be connected, with opposite polarities, to first and second electrical pads of a circuit board. This may allow a selected one of the first and second sets of individually addressable light-emitting elements to be operated to emit light by controlling a polarity of voltage provided to the sets of individually addressable light-emitting elements via the first and second electrical pads. The number of electrical pads 112 on the circuit board 110 used to provide current and/or voltage to sets of individually addressable light-emitting elements 114 of the circuit board 110 is further reduced by using an electrical pad 112 in common between a number of sets of individually addressable light-emitting elements 114 and/or pairs of sets of individually addressable light-emitting elements 114 (as illustrated in FIG. 1). Other configurations of interconnections between individually addressable light-emitting elements and electrical pads of a circuit board may be used.

The circuit board 110 may comprise a die a die composed of gallium arsenide, silicon, and/or other semiconductor materials), on which or in which other components of the light emitter 100 are formed. In some embodiments, the circuit board 110 is a printed circuit board (PCB). Such a circuit board may have a FR-4 glass epoxy substrate with copper conductive layers, in some embodiments. The copper conductive layers could be etched or deposited, in various embodiments, to define the electrical interconnects 118, for example. Furthermore, the electrical interconnects 118 may be connected to electrical pads 112 on the circuit board 110 such that each of the sets of individually addressable light-emitting elements 114 can be operated by providing current and/or voltage to corresponding electrical pads 112 on the circuit board 110.

In alternate embodiments, the circuit board 110 may be replaced with a flexible material. For example, organic LEDs may be formed in an organic semiconductor substrate to define the individually addressable light-emitting elements 114. Still further, in some alternate embodiments, the individually addressable light-emitting elements 114 may be attached (e.g., physically and/or electrically) to one another to define an array. This may obviate the need to include a structure on which the individually addressable light-emitting elements are arranged (e.g., the circuit board 110).

The individually addressable light-emitting elements 114 could include LEDs, VCSELs, lasers, or other individually addressable light-emitting components formed on or of the circuit board 110. For example, if the circuit board 110 were a semiconductor material, the individually addressable light-emitting elements 114 could include light-emitting diode regions, light-emitting quantum wells, Bragg reflectors, or other elements formed from gallium arsenide, aluminum gallium arsenide, positive or negative doping materials, or other materials or structures. Forming the individually addressable light-emitting elements 114 could include photopatterning, photolithography, chemical vapor deposition, sputtering, oxidation, ion implantation, or other methods for forming elements of an integrated optoelectronic circuit.

The individually addressable light-emitting elements 114 may be packaged in such a way that a portion of the individually addressable light-emitting elements 114 does not emit light. This could be because the packaging occludes some of the light-emitting area. Alternatively, there may be electrical components integrated within each individually addressable light-emitting elements 114, which prevent the entire individually addressable light-emitting element 114 from being capable of emitting light. The effective portion of the individually addressable light-emitting element 114 may be referred to as the projecting surface 116, in some embodiments.

The astigmatic optical element of a light emitter, as described herein, could be configured in a variety of ways, and include a variety of elements (e.g., lenses, mirrors, diffraction gratings, and/or prisms) such that light emitted from a set of individually addressable light-emitting elements of the light emitter is projected as a pattern of illumination that varies with angle across a first range of angles in a first direction (e.g., that provides illumination within one or more ranges of angles within the first range of angles). This could include focusing and/or deflecting light emitted by the individually addressable light-emitting elements, with respect to the first direction, such that the location of a particular individually addressable light-emitting element is related to a range of angles of the environment. This could further include defocusing and/or spreading light from the individually addressable light-emitting element with respect to a second direction.

Because the projecting surfaces 116 may not occupy the entirety of the surface of the individually addressable light-emitting element 114, the patterns of illumination produced by adjacent individually addressable light-emitting elements 114 may not lie directly adjacent to one another. For this reason, the individually addressable light-emitting elements 114 may be staggered with respect to one another, as illustrated in FIG. 1. This could allow the projecting surfaces 116 of adjacent individually addressable light-emitting elements 114 to align with each other in one or more directions, thereby allowing the respective patterns of illuminations to lie align with one another.

As shown in FIGS. 1-4, the astigmatic optical element includes a single refractive aspheric cylindrical lens 102. However, an astigmatic optical element of a light emitter, as described herein, could include additional or alternative elements configured to focus, deflect, or otherwise modify light emitted from the individually addressable light-emitting elements 114 of the light emitter. In an example embodiment, the astigmatic optical element focuses light produced by sets of one or more of the individually addressable light-emitting elements 114 to produce illumination patterns such as those described herein.

To do so, such an astigmatic optical element could include a diffraction grating, a hologram, or some other reflective, refractive, and/or absorptive elements. The astigmatic optical element could include a reflective element having an aspheric optical surface. The astigmatic optical element could include a single lens, mirror, grating, or other optical element. Alternatively, the astigmatic optical element could include multiple optical components (e.g., multiple lenses, multiple gratings, and/or multiple mirrors).

In some examples, the astigmatic optical element could include a single refractive or reflective lens having a first surface having a geometry specified to focus and/or deflect the emitted light in a first direction (e.g., a cylindrical geometry, such as an aspheric cylindrical geometry). Such a refractive or reflective lens could include a second surface having a geometry specified to defocus and/or spread the emitted light in a second direction that is substantially orthogonal to the first direction (e.g., a concave geometry) such that each individually addressable light-emitting element, when operated to emit light, provides light across a similar range of angles in the second direction. Such an astigmatic optical element could therefore focus the light emitted from each individually addressable light-emitting element into a substantially linear illumination pattern, for example.

Components or features of the astigmatic optical element could be formed on a circuit board, for example, using optically transparent materials, or other elements on the surface of the circuit board (e.g., using methods used for integrated circuit fabrication). Additionally or alternatively, the astigmatic optical element could be bonded to the circuit board using an adhesive, clips, an armature, or some other means. This could include bonding the astigmatic optical element (e.g., using an adhesive) to the circuit board directly, to a package that encloses the circuit board (e.g., a ceramic, metal, or polymer integrated circuit package that includes a window), or to some other component of a light emitter. A light emitter could include further optical elements in addition to the astigmatic optical element; for example, a plurality of microlenses could be provided on the surface of the circuit board to focus, collimate, or otherwise modify the emission pattern of light emitted from each of the individually addressable light-emitting elements.

As noted above, a light emitter (e.g., 100) could be operated to provide a number of different patterns of illumination, during respective different periods of time, to an environment. The patterns of illumination could be specified such that an intensity of illumination received over time by an object in the environment (e.g., by a light detector of such an object), from the light emitter, could be used to determine the location of the object within the environment (e.g., to determine the angle of the object relative to the light emitter). This could involve determining a pattern of light incident on the object during different periods of time corresponding to different illumination patterns. The location of the object (e.g., the angle of the object relative to the light emitter) could then be determined by determining a region (e.g., a range of angles) within the environment that corresponds, based on the different patterns of illumination, to the pattern of received light.

Other configurations of a light emitter and of electrical interconnects, electrical pads, individually addressable light-emitting elements, projection surfaces, or other elements or features thereof are anticipated by the inventors. A circuit board could include a number of sets of interconnected individually addressable light-emitting elements (e.g., at least one hundred sets) such that the sets of individually addressable light-emitting elements could be operated to produce respective different patterns of illumination to facilitate determination of the location of an object in an environment that receives the patterns of illumination. Such sets of one or more individually addressable light-emitting elements could be interconnected with each other and/or with electrical pads of a circuit board in a variety of ways. For example, each set of individually addressable light-emitting elements could be connected to a respective pair of electrical pads of the circuit board, or a number of sets could be connected in common to a single electrical pad (e.g., according to a common-cathode arrangement or a common-anode arrangement). Additionally or alternatively, pairs of sets of one or more individually addressable light-emitting elements could share one or more electrical pads, being connected to such shared terminals according to an opposite polarity (that is, the anodes of the individually addressable light-emitting elements of a first set could be connected to an in-common terminal while the cathodes of the individually addressable light-emitting elements of a second set could be connected to the in-common terminal) such that each set of such a pair could be operated, during a respective period of time, to provide a respective pattern of illumination by providing voltage of a corresponding polarity to the in-common terminal(s). Other configurations of electrical pads on a light emitter, as described herein, are anticipated by the inventors.

Figure 2:
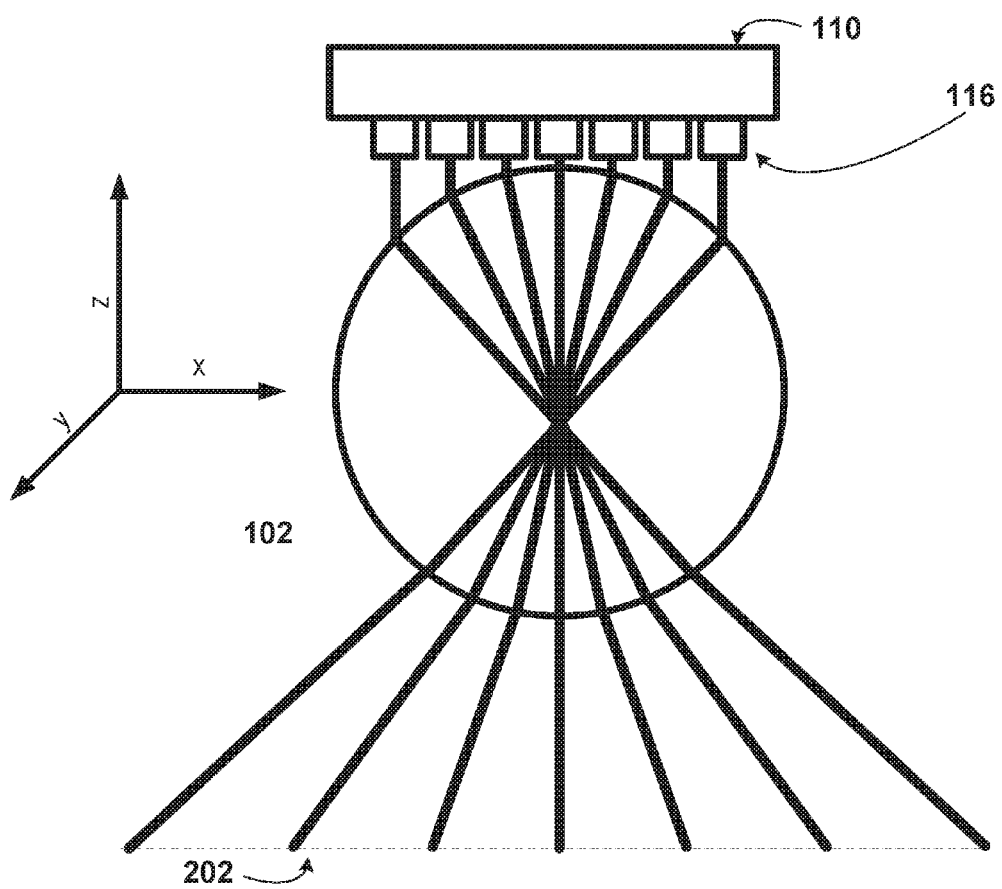
FIG. 2 is a top view of an array of individually addressable light-emitting elements and an astigmatic optical element, according to example embodiments.

FIG. 2 illustrates, in cross-section, the effect of an astigmatic optical element (e.g., the cylindrical lens 102 illustrated in FIG. 1) of a light emitter 100 on light emitted from projecting surfaces 116 of individually addressable light-emitting elements 114 on a circuit board 110 of the light emitter 100. Note that the dimensions, angles of emitted illumination, operation of the cylindrical lens 102 to refract light, and other aspects of FIG. 2 are intended to conceptually illustrate the production of patterns of illumination (e.g., substantially linear illumination patterns) by a light emitter as described herein and are not intended to literally represent optical or other properties (e.g., angles or locations of rays of light, emission patterns of LEDs, apparent refractive indices of optical elements, focal lengths of refractive elements, an overall divergent or convergent character of a refractive element and/or of a light field produced by such an element, angles of refraction of rays of light by refractive elements) of a particular embodiment of such a light emitter.

FIG. 2 shows a top view of a cross-section through the circuit board 110 and the cylindrical lens 102 of the light emitter 100. A first set of one or more individually addressable light-emitting elements 114 of the circuit board 110 are projecting light toward the cylindrical lens 102 from the projecting surfaces 116, as shown. The cylindrical lens 102 is configured to focus, refract, deflect, or otherwise modify light emitted from individually addressable light-emitting elements 114 such that a substantially linear illumination pattern is produced (e.g., at a measurement plane 202 where a light detector may be located) by the operation of such individually addressable light-emitting elements 114. The substantially linear illumination pattern may vary across an angular range according to the location on the circuit board 110, an emission profile, or other properties of the individually addressable light-emitting elements 114 on the circuit board 110 and/or the location and orientation of the individually addressable light-emitting elements 114 relative to the cylindrical lens 102. Properties of the cylindrical lens 102, the emitter 100 (e.g., an emission profile of the individually addressable light-emitting elements 114), or other elements of the light emitter 100 could be specified such that the width of the substantially linear illumination patterns intersecting the measurement plane 202 are wider or narrow, for example.

As illustrated in FIG. 2, each of the projecting surfaces 116 may form light from a corresponding individually addressable light-emitting element 114 into a certain pattern. The pattern emitted from each surface 116 may be substantially linear when projected onto the vertical/horizontal plane at the measurement surface 202 (i.e., the illumination patterns may be elongated in the vertical dimension and focused in the horizontal dimension). The projecting surfaces 116 of the individually addressable light-emitting elements 114 may be arranged with respect to one another to such that the angular range can be spanned. The angular range may span 30 degrees, 45 degrees, 60 degrees, 75 degrees, or 90 degrees, when defined with respect to the light emitter 100, for example.

Figure 3:
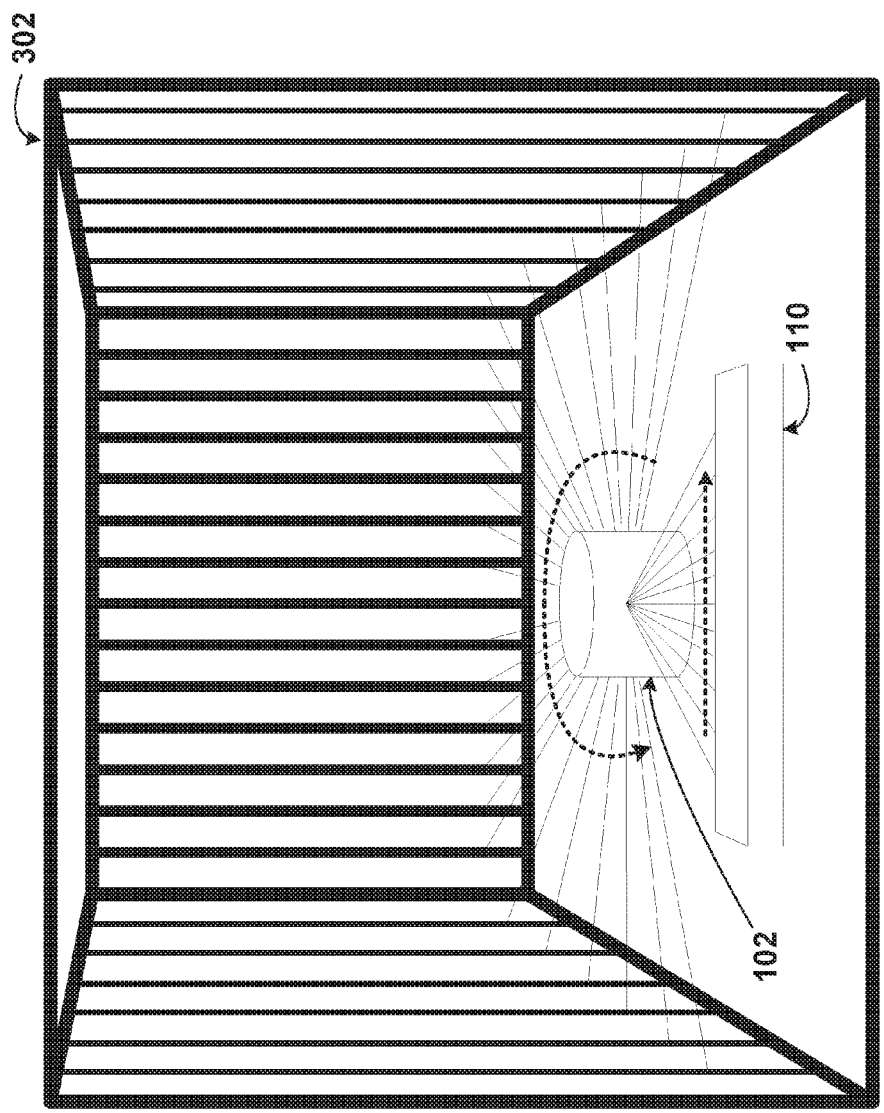
FIG. 3 is a perspective view of an array of individually addressable light-emitting elements projecting into an environment, according to example embodiments.

FIG. 3 is a perspective illustration of a light emitter (e.g., the light emitter 100 illustrated in FIG. 1) sequentially projecting illumination patterns into an environment 302 (e.g., a room). The light emitter may include a cylindrical lens 102 and a circuit board 110, with individually addressable light-emitting elements 114 thereon (occluded from view), for example. The cylindrical lens 102 may focus the light emitted by the individually addressable light-emitting elements 114 to produce substantially linear illumination patterns at corresponding angles with respect to the light emitter 100. As the individually addressable light-emitting elements 114 are sequentially activated, the substantially linear illumination may progress through an angular range with respect to the light emitter 100 (as indicated in FIG. 1 by the dashed arrows). In various embodiments, the angular range may vary in the horizontal/depth plane or in the vertical/depth plane (e.g., if the light emitter 100 were rotated 90 degrees in the horizontal/vertical plane.). The angular range may span 15 degrees, 30 degrees, 45 degrees, 60 degrees, 75 degrees, 90 degrees, 105 degrees, 120 degrees, 135 degrees, 150 degrees, 165 degrees, 180 degrees, or 195 degrees in various embodiments. Other angular range spans are possible.

The spacing between, width, and location of the substantially linear illumination patterns illustrated in FIG. 3 are provided as an example, and are not meant to indicate a preferred embodiment. It will be readily understood that multiple projection patterns are possible when sequentially illuminating the individually addressable light-emitting elements 114. In some embodiments, for example, the interstitial space between adjacent substantially linear illumination patterns may be smaller than illustrated. In fact, when the individually addressable light-emitting elements 114 are staggered with respect to one another in an array on the circuit board 110, the substantially linear illumination patterns may be projected conterminously to one another (e.g., the left edge of one of the substantially linear illumination patterns may lie immediately adjacent to the right edge of an adjacent substantially linear illumination pattern). This may allow, if all of the individually addressable light-emitting elements 114 were activated simultaneously, a synchronization pulse to vertically illuminate the entire portion of the environment 302 that lies within the angular range.

Determination of the location of an object (e.g., determination of the angle of a light detector in the first direction relative to the light emitter 100) based on time-varying patterns of illumination received from the light emitter 100 can include determining the timing of detection of the illumination (e.g., the timing of detection of a given light intensity from a plurality of measurements of the intensity of light received by a light detector) relative to the timing of time periods during which each of a number of different patterns of illumination are produced by the light emitter 100. In some examples, such timing information could be determined by the light emitter 100 and a light detector 420 both including highly accurate, synchronized clocks. In other examples, the light emitter 100 could include a radio frequency transmitter (or other means for wireless information transmission) that is operated to emit such timing information. In still further examples, such timing information could be recovered from the time-varying pattern of illumination received by a light detector from the light emitter 100. In some embodiments, the timing information could be recovered by recovering pulse timing information from changes (e.g., rising or falling edges) in a detected time-varying illumination signal.

Figure 4:
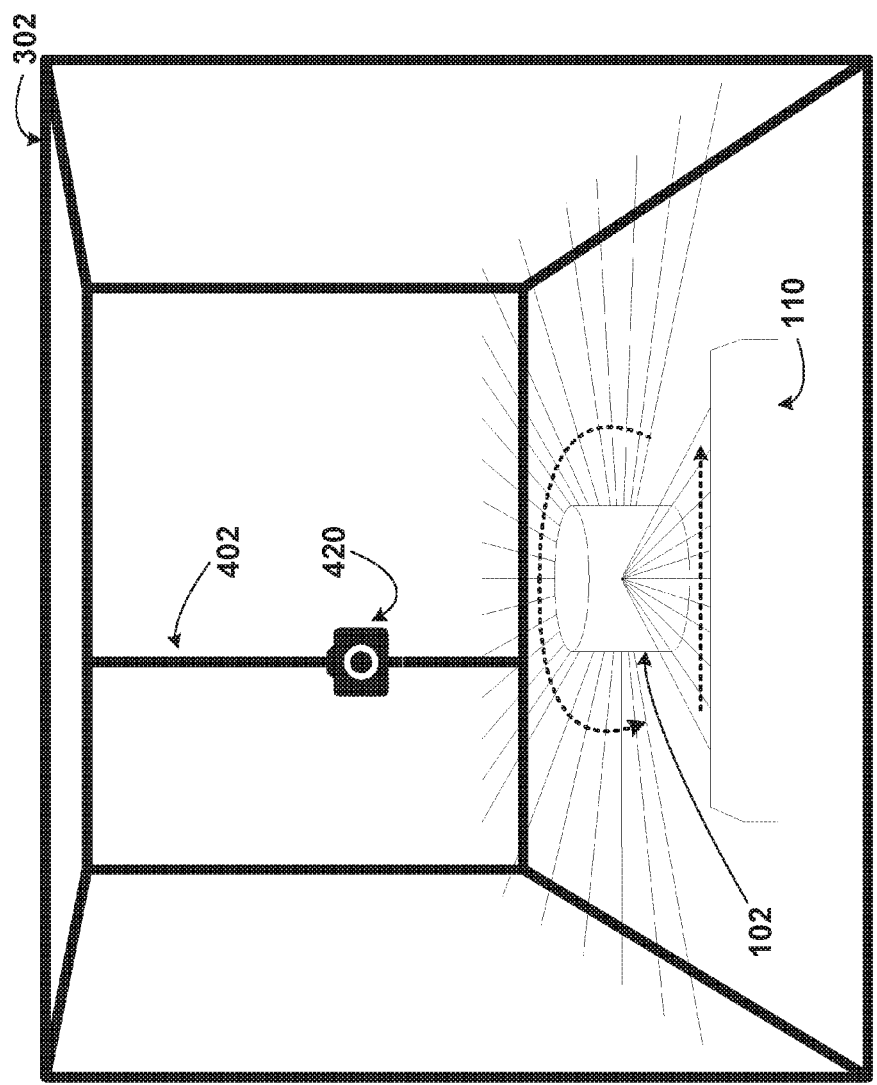
FIG. 4 is a perspective view of an array of individually addressable light-emitting elements projecting at a light detector, according to example embodiments.

As illustrated in FIG. 4, the light emitter 100 may emit light into an environment 302 (e.g., a room) in the form of substantially linear illumination patterns (as illustrated in FIG. 3). This could be accomplished by the light emitter 100 using an astigmatic optical element (e.g., a cylindrical lens 102) and a series of individually addressable light emitting elements 114 (occluded from view in FIG. 4) arranged into an array on a circuit board 110, for example. As the individually addressable light emitting elements 114 are sequentially activated (e.g., by a control system also on the circuit board 110 connected to the individually addressable light-emitting elements 114 using electrical interconnects 118), substantially linear illumination patterns may illuminate different angles within an angular range defined by the light emitter 100 in the environment 302. The sequential scanning is illustrated in FIG. 4 by the dashed arrows. Further, the locations where substantially linear illumination patterns could be projected are illustrated by the solid lines emanating from the cylindrical lens 102. The substantially linear illumination pattern that is projected to the angular position of the light detector 420 is indicated in FIG. 4 by reference numeral 402.

As described above, determining the angular position of an object (e.g., the light detector 402) based on a detected time-varying intensity of light received from a light emitter can include making such determinations based on information about the timing of patterns of illumination emitted from the light emitter. Such timing information could be based on an internal clock of a controller of the object, or based on timing information received using a receiver timing information transmitted via radio frequency signals from the light emitter). Additionally or alternatively, the timing information could be present e timing of emission of patterns of illumination by the light emitter. For example, the light emitter could provide illumination to all of the first range of illumination during one or more particular periods of time to provide synchronization timing or other data to an object. In some examples, providing one or more of the patterns of illumination could include modulating one or more of the provided patterns of illumination (e.g., by varying an intensity of the provided illumination across a range of intensities and/or between a number of different discrete levels of illumination) at a specified frequency or according to some other pattern over time to provide timing information (e.g., to identify one or more of the patterns of illumination as a 'first' pattern in a sequence of patterns of illumination) or to provide some other information.

Note that the detected substantially linear illumination pattern 402, as illustrated, is intended as a non-limiting example of a pattern that could be provided by the light emitter 100 as described herein. As an alternate example, a set of patterns of illumination provided by light emitter could vary across a first range of angles; a further pattern of illumination could provide illumination to all of the first range of angles. Such a pattern could be provided, as described above, to provide timing or other information to objects in the environment. Additionally or alternatively, such a pattern of illumination could be used to determine whether a given object is within the first range of angles and thus whether the light emitted from the light emitter can be used to determine the angular position of the given object.

A number of different patterns of illumination (and corresponding number of sets of one or more individually addressable light-emitting elements of a light emitter) could be specified to provide determination of the angular position of an object in an environment of interest to at least a specified resolution or accuracy. For example, ten or more different substantially linear illumination patterns could be provided by a light emitter (e.g., from ten or more corresponding sets of one or more light emitting elements of the light emitter) during respective different periods of time (e.g., during a plurality of repeated respective periods of time, according to a repeating sequence in time of producing the different substantially linear illumination patterns). Each of the provided substantially linear illumination patterns, when detected by a light detector of an object in the environment during a respective period of time, could provide a corresponding angular range in which the object is located relative to the light emitter. The angular range in which the object is located may occupy a span of angles based on the width of the corresponding substantially linear illumination pattern. As noted above, the number of provided different patterns of illumination could be specified to facilitate determination of the angular position of such an object to a specified degree of resolution. For example, providing ten or more different substantially linear illumination patterns could facilitate the determination of the angular position of an object to a resolution of 9 degrees if the complete angular range swept out by the light emitter were 90 degrees. An angular resolution of 9 degrees may correspond to a linear distance resolution of 15.6 centimeters when such an object is within 1 meter of a light emitter that is providing the substantially linear illumination patterns. Additionally, if the intensity profile of the substantially linear illumination patterns vary with respect to angle (e.g., due to the Gaussian nature of an individually addressable light-emitting element, such as a laser), and a light detector on the object can detect the variations in intensity, the angular resolution could be enhanced further.

As described above with respect to FIG. 1, the projecting surface 116 of individually addressable light-emitting elements 114 may not occupy the entire surface of the individually addressable light-emitting elements 114. Therefore, the illumination patterns (e.g., substantially linear illumination patterns if the individually addressable light-emitting elements 114 are focused by a cylindrical lens) projected by the respective individually addressable light-emitting elements 114 may not be as wide or as tall as the corresponding individually addressable light-emitting elements 114. Further, even if individually addressable light-emitting elements 114 are placed directly adjacent to one another, their respective illumination patterns may not lie adjacent to one another. To compensate, an array 500 of individually addressable light-emitting elements 114 on a circuit board 110 may be designed as illustrated in FIG. 5.

As illustrated, the individually addressable light-emitting elements 114 may be spaced in a primary direction within a die (e.g., vertically), such that an edge (e.g., bottom) of one projecting surface 116 aligns with an edge (e.g., top) of another projecting surface 116. This is illustrated by the dashed lines in FIG. 5. Further, the individually addressable light-emitting elements 114 may be abutted with each other in a secondary direction that is substantially orthogonal to the primary direction (e.g., horizontally). Due to the package size of the individually addressable light-emitting elements 114, however, the individually addressable light-emitting elements 114 may need to be disposed, incrementally, in increasing dimension in the secondary direction, in order to align. This increasing dimension may be reset to a starting location in the secondary direction (e.g., the left side of the leftmost individually addressable light-emitting elements 116) once a certain location in the primary direction has been reached such that there is space at the starting location in the secondary direction to place another individually addressable light-emitting element 114. In the example embodiment of FIG. 5, once a disjointed row of four individually addressable light-emitting elements 114 has been aligned, a new disjointed row can begin. The direction of the die in which the individually addressable light-emitting elements 114 are designed to align may correspond to a direction of spreading for a respective astigmatic optical element, for example. In other embodiments, used to scan an environment horizontally rather than vertically for example, the individually addressable light-emitting elements 114 may be aligned horizontally in disjointed columns as opposed to rows. For example, the array 500 illustrated in FIG. 5, and a corresponding cylindrical lens, could be rotated 90 degrees clockwise or counterclockwise to be used to scan an environment horizontally rather than vertically (illustrated further with respect to FIG. 7).

Further, the individually addressable light-emitting elements of an interconnected set of one or more individually addressable light-emitting elements could be arranged in some other manner across the surface of a circuit board of a light emitter. For example, the individually addressable light-emitting elements could be arranged in multiple columns/rows or otherwise distributed across the circuit board in order to increase an amount of light emitted from the light emitter and/or reduce a temperature of the array of individually addressable light-emitting elements when the array is operated to sequentially project substantially linear illumination patterns. Because the individually addressable light-emitting elements may be distributed across a wider area, there could be more surface area for heat dissipation, which could thereby reduce the overall temperature of the array of individually addressable light-emitting elements.

Figure 5:
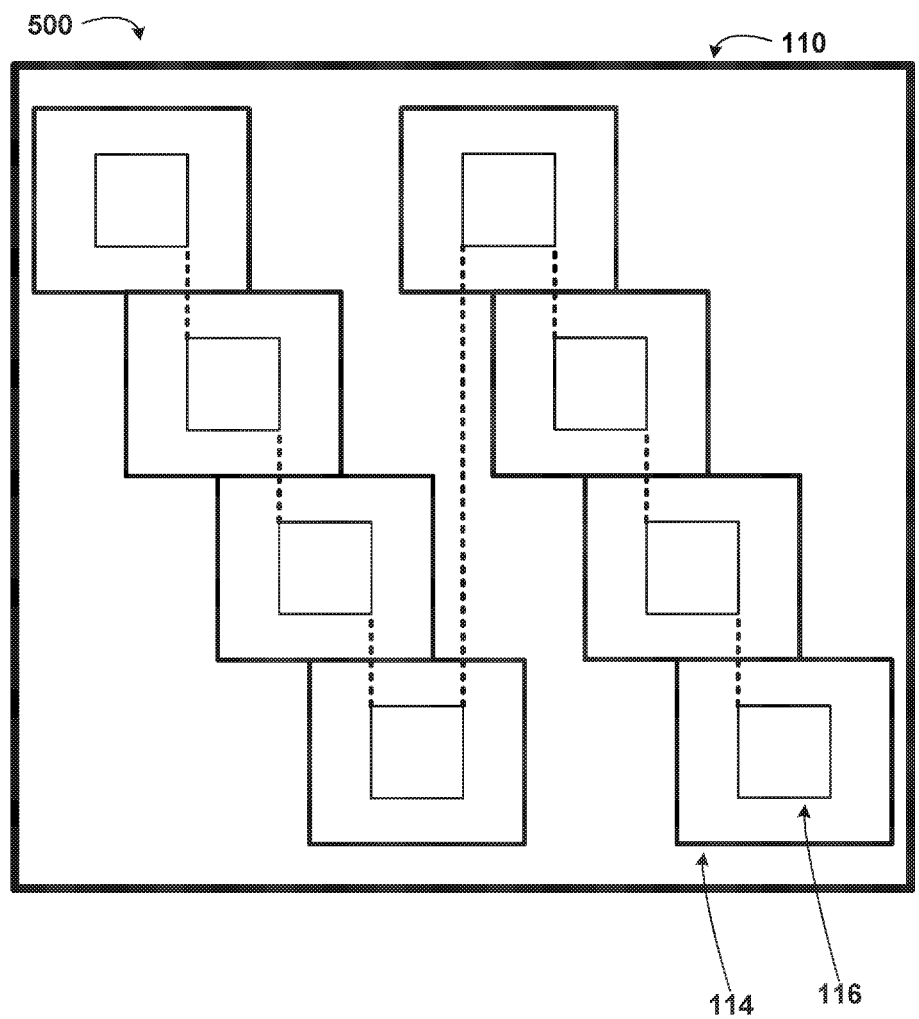
FIG. 5 is a front view of a staggered array of individually addressable light-emitting elements, according to example embodiments.

The above distribution design may be employed in addition to or alternative to the staggering design illustrated in FIG. 5. For example, the pattern of eight staggered individually addressable light-emitting elements of FIG. 5 could be replicated on a different section of the circuit board that has the same horizontal location, but a different vertical location (i.e., the pattern of eight staggered individually addressable light-emitting elements of FIG. 5 is duplicated, but shifted up or down). Because the astigmatic optical element of the light emitter can spread light in the horizontal direction, if oriented in accordance with the array so as to do so, the replicated pattern of eight staggered individually addressable light-emitting elements could serve to reinforce/enhance the intensity of the corresponding substantially linear illumination patterns already being produced by the original pattern of eight staggered individually addressable light-emitting elements.

The distribution of individually addressable light-emitting elements across a circuit board in a light emitter could be provided in order to reduce an average and/or peak temperature of the light emitter when the individually addressable light-emitting elements are being operated to emit light. This could be done by spreading the production of such waste heat over a wider area of the circuit board or according to some other consideration (e.g., to simplify routing of electrical interconnects and/or electrical pads on the circuit board, to provide a configuration of individually addressable light-emitting elements, electrical interconnects, or other features that is compatible with circuit board fabrication process, or to increase the amount of light output from the light emitter).

Figure 6:
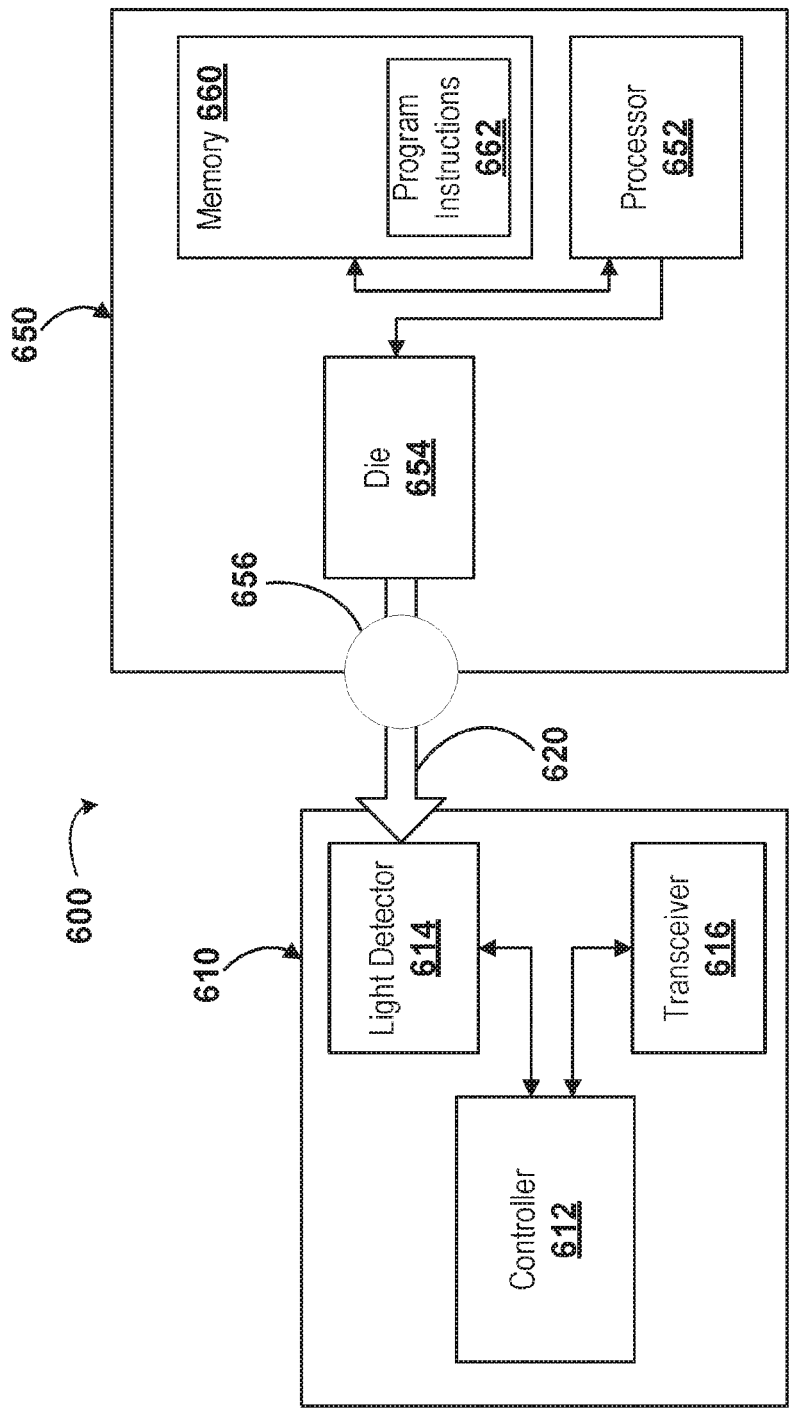
FIG. 6 is a block diagram of an example system that includes light emitter and an object.

FIG. 6 is a block diagram of a system that includes a light emitter 650 that is configured to provide a plurality of different patterns of illumination as described elsewhere herein to an environment within which an object 610 is located. The object 610 includes a light detector 614 and a controller 612 configured to detect illumination 620 emitted from the light emitter 650. The object 610 further includes a transceiver 616 configured to transmit and/or receive information to and/or from some other device (e.g., from the light emitter 650). The light detector 614 is configured to detect a property (e.g., an intensity) of light 620 received from the light emitter 650 (e.g., light emitted as one or more substantially linear illumination patterns from the light emitter 650 during respective different periods of time). Such light can be detected and used to determine a location (e.g., an angle in a first direction relative to the light emitter 650) of the object 610. The light emitter 650 includes a die 654, which could be disposed on a circuit board for example, that includes one or more individually addressable light-emitting elements configured to provide light, via an astigmatic optical element 656 (e.g., a cylindrical lens), to reproduce respective patterns of illumination to an environment that contains the object 610 (e.g., substantially linear illumination patterns). The light emitter 650 further includes a processor 652 and a memory 660 configured to facilitate operation of the die 654 to produce such patterns of illumination.

The light emitter 650 is configured to produce, during respective periods of time, different patterns of illumination. Emitting each different pattern of illumination includes emitting illumination within one or more ranges of angles of a first range of angles in a first direction relative to the device. Thus, each pattern of illumination varies across the first direction such that an object (e.g., 610) can detect the intensity of light received from the light emitter 650 during such different periods of time and use the detected light intensities to determine the location of the object 610 in an environment (e.g., to determine the angle of the object 610 relative to the light emitter 650 in the first direction). The light emitter 650 producing a particular pattern of illumination includes generating light from a set of one or more interconnected individually addressable light-emitting elements (e.g., LEDs, lasers, VCSELs) of the die 654.

The processor 652 of the light emitter 650 is configured to operate the die 654 (e.g., to apply voltages and/or currents to the different sets of one or more individually addressable light-emitting elements of the die 654) to produce different patterns of illumination from the light emitter 650. The processor 652 could include one or more microcontrollers, application-specific integrated circuits (ASICs), field-programmable gate arrays (FPGAs), or other electronic components configured to operate the die 654 to produce different patterns of illumination during different periods of time. The processor 652 could include elements configured to performs such actions using program instructions 662 or other information contained within the memory 660 (e.g., to generate a sequence of patterns of illumination according to a stored pseudo-random sequence or according to some other sequence, or to indicate some timing information or other information by emitting illumination 620 using the die 654). Alternatively, the light emitter 650 could include, instead of the processor 652 and memory 660, a number of flip-flops, timers, multiplexers, counters, or other circuits configured to operate the die 654 to produce patterns of illumination according to a sequence that is statically set by the structure of such circuits (e.g., to provide each of a set of patterns of illumination for a specified period of time in a repeating sequence).

The memory 660 can include program instructions 662 for execution by the processor 652 to cause the light emitter 650 to produce different patterns of illumination during respective different periods of time by emitting light from respective different sets of one or more individually addressable light-emitting elements on the die 654 or to perform some other operations. The memory 660 may include non-volatile and/or volatile memory, in various embodiments. In some examples, the program instructions 662 could include instructions to provide the different patterns of illumination according to a set sequence (e.g., such that each of the different patterns of illumination are presented repeatedly in turn). Alternatively, the program instructions 662 could include instructions to provide the different patterns of illumination according to a random or pseudorandom sequence. In yet another example, the program instructions 662 could include instructions to provide a subset of the different patterns of illumination. For example, if the angular position of an object is known to a low resolution (e.g., it is known that the object is located within a second half of a range of angles of interest based on detecting light previously emitted from the light emitter 650), only a subset of different patterns of illumination could be provided to facilitate determination of the angular position of the object to a greater resolution and/or at a higher rate over time.

In a still further example, program instructions 662 could include instructions to provide illumination across a range of angles of interest to signal some information to objects in an environment. Signaling information to objects could include indicating timing information about previous or subsequent patterns of illumination emitted from the light emitter 560 or providing information about the identity or other information about patterns of illumination emitted from the light emitter 650 and/or information about the order of production of such patterns (e.g., a seed value or other information about a pseudorandom sequence of patterns of illumination).

In some examples, the light emitter 650 could include a transceiver, a communications interface, a user interface, one or more further dies, or some other components, and the program instructions 662 could include instructions to operate such further components to provide some functionality. For example, the light emitter 650 could include a transceiver configured to communicate with the object 610 (e.g., via the transceiver 616 of the object 610). The program instructions 662 could include instructions to operate the transceiver to transmit timing information, information about patterns of illumination and/or a sequence of production of such patterns by the light emitter 650, or some other information to the object 610. Additionally or alternatively, the program instructions 662 could include instructions to operate the transceiver to receive location information determined by the controller 612 of the object 610 based on light intensities detected using the light detector 614, to transmit information about such detected intensities such that the processor 652 can determine the angular position of the object 610 based on such detected intensities, or to receive some other information from the object 610. The program instructions 662 could include instructions to operate such a transceiver to communicate with some other systems (e.g., to transmit information about a determined angular position of the object 610 to a phone, a computer, or some other system).

The light emitter 650 can be part of a smart phone, digital assistant, head-mounted display, controller for a robot or other system, or some other portable computing device. In such examples, the light emitted from the light emitter 650 (e.g., as different patterns of illumination) could be used to determine the location of objects (e.g., of objects including light detectors) relative to such other objects (e.g., the location of a user's hand, on which is disposed a light detector, relative to a user's head, on which a head-mounted display including the light emitter 650 is disposed). Alternatively, the light emitter 650 can be part of a system that is mounted to a floor, wall, ceiling, or other object or building such that the location of the light emitter 650 is relatively static relative to an environment of interest. In such examples, the light emitted from the light emitter 650 could be used to determine the location of objects (e.g., of objects including light detectors) relative to the environment (e.g., the location of segments of a person's body, on which are disposed a number of respective light detectors, to facilitate detection of motions of the person's body within the environment). Other configurations and/or applications of a light emitter as described herein are anticipated by the inventors.

The object 610 could be part of or disposed on a system (e.g., a drone), a tag or other device attached to an object or person of interest (e.g., to a body segment of a person, to facilitate motion capture), or configured in some other way to facilitate determination of the location of the object 610 based on a time-varying intensity of light received from the light emitter 650. This includes detecting such an intensity of light using the light detector 614 of the object 610. The light detector 614 could include a photodiode, a phototransistor, or some other elements that are sensitive to light emitted from the light emitter 650 (e.g., to light at a wavelength corresponding to the wavelength of light emitted from individually addressable light-emitting elements of the die 654 of the light emitter 650).

The controller 612 could include a variety of elements configured to operate the light detector 614 to detect the intensity or other properties of light received from the light emitter 650 and/or to perform some other operations. For example, the controller 612 could include logic gates, arithmetic logic units, microprocessors, registers, digital oscillators, counters, logical buses, amplifiers, analog-to-digital converters (ADCs), mixers, analog oscillators, buffers, memories, program instructions, or some other component or components. The controller 612 could be configured to determine the location of the object 610 based on such detected illumination from the light emitter 650 and/or to transmit, using the transceiver 616, information about the detected illumination (e.g., about the intensity of the received illumination at a plurality of points in time, about the timing, sequence, or other information about a series of changes in the intensity of such received illumination over time) to some other system (e.g., the light emitter 650, a phone, a computer). The controller 612 could be configured to perform some other operations.

The controller 612 could include a variety of components used to detect illumination from the light emitter 650 that is received by the light detector 614. The light detector 614 could include a photodiode, a phototransistor, a photoresistive element, or some other components configured to output a voltage, a current, or some other electrical signal related to the intensity or other properties of the received light 620. The controller 612 could include amplifiers, transimpedance amplifiers, filters, buffers, voltage references, ADCs, or other components configured to operate the light detector 614 to detect the illumination 620 received from the light emitter 650. The controller 612 could include further circuitry (e.g., clock recovery circuitry to determine relative timing information from transitions in the intensity of the detected illumination, asynchronous serial receiver circuitry to detect a sequence of changes in the intensity of the received illumination that are relative to the location of the object 610).

The controller 612 could be configured to detect, using the light detector 614, illumination from multiple light emitters and/or from multiple different dies of a light emitter. In some examples, the controller 612 could include digital or analog filters configured to facilitate detecting illumination received from multiple different light emitters and/or from multiple different dies of a light emitter. This could be done by detecting components of the illumination received by the light detector 614 that vary at respective different frequencies corresponding to frequencies of modulation of the illumination emitted from different dies and/or different light emitters. Additionally or alternatively, the light detector 614 could include multiple different light-sensitive elements (e.g., different photodiodes and/or optical filters coupled to such photodiodes) that are sensitive to illumination at respective different wavelengths corresponding to the wavelength of illumination produced by different light emitters and/or different dies of a light emitter. This could facilitate detection of illumination received from such multiple different light emitters and/or from multiple different dies of a light emitter.

It is noted that the block diagram shown in FIG. 6 is described in connection with functional modules for convenience in description. However, embodiments of the object 610 and/or the light emitter 650 can be arranged with one or more of the functional modules ("sub-systems") implemented in a single integrated circuit (e.g., an integrated circuit that includes a light detector and circuitry for detecting an intensity of light received via the light detector), multiple integrated circuits or electronic assemblies (e.g., printed circuits boards with electronic components disposed thereon), or according to some other consideration.

Note that the illustrated components of the object 610 and the light emitter 650 are intended as a non-limiting example embodiment. Also note that light emitters configured to provide patterns of illumination to an environment, objects located in such an environment, and/or light detectors located in such an environment as described herein may include more or fewer of the illustrated elements and/or may include further elements. For example, an object that is located in an environment and that includes a light detector configured to detect light emitted from a light emitter may lack a controller or other elements configured to operate the light detector and/or to determine the location of the object. In such examples, the light emitter could be tethered via a cable to some other system (e.g., to the light emitter 650) that is configured to detect the light received via the light detector and to determine the location of the light detector. Further examples of light emitters, light detectors, tags, and/or other objects or systems configured to produce and/or detect patterns of illumination as described herein are anticipated by the inventors.

As described elsewhere herein, a light emitter could include a die and an astigmatic optical element configured to provide patterns of illumination from the light emitter that vary according to angle in a specified direction relative to the light emitter. This could be done by generating light from corresponding individually addressable light-emitting elements of the die. The location of such individually addressable light-emitting elements on the die could correspond to the angle or range of angles of illumination produced from the light emitter when the individually addressable light-emitting elements are operated to emit light. A light emitter configured in this way can provide such patterns more efficiently, in a smaller form factor, with minimal components and for minimal cost, or according to some other consideration in a manner that is improved relative to other apparatuses or methods for producing such patterns of illumination (e.g., using a digital micromirror device to control which portions of light produced by a light source will be provided to an environment). Such a die and/or astigmatic optical element could be configured in a variety of ways to facilitate production of a variety of different patterns of illumination.

For example, while such a light emitter is described elsewhere herein as including a single die that is disposed relative to an astigmatic optical element, multiple dies could be disposed relative to such an astigmatic optical element. These multiple dies could provide respective patterns of illumination from respective sets of light-emitted elements of the different dies. Such different dies could be provided to increase a degree of power dissipation from the dies, to increase a total number of sets of individually addressable light-emitting elements on the dies and corresponding total number of different patterns of illumination that can be provided by the light emitter, or to provide some other functionality. This is illustrated by way of example in FIG. 8, which shows a first die 814 and a second die 824 that each include respective pluralities of light-emitting elements and are each set behind a first astigmatic optical element 810 and a second astigmatic optical element 820, respectively.

As described above, FIG. 7a is a top view of an array of individually addressable light-emitting elements 714 arranged on a circuit board 710 that project light toward a cylindrical lens 702. If sequentially activated, the array of individually addressable light-emitting elements 714 may repeatedly project the substantially linear illumination pattern across an angular range with respect to the light emitter (as illustrated by the arrow). The angular range swept out by the light emitter in FIG. 7a lies in the horizontal/depth plane (axes indicated in FIG. 7a). As indicated, the individually addressable light-emitting elements 714 are spaced incrementally along the horizontal axis and the primary axis of the cylindrical lens 702 is substantially parallel to the vertical axis.

Figure 7A:
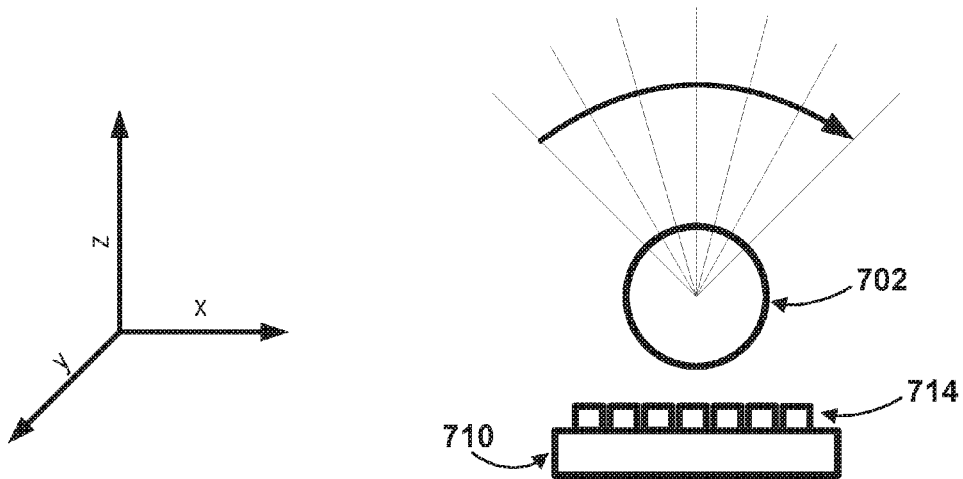
FIG. 7*a* is a top view of light from an array of individually addressable light-emitting elements being focused by an astigmatic optical element, according to example embodiments.
Figure 7B:
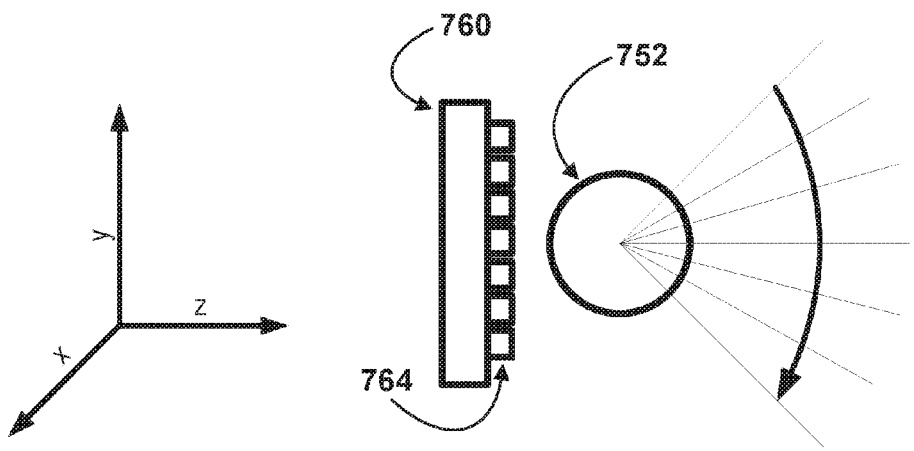
FIG. 7*b* is a side view of light from an array of individually addressable light-emitting elements being focused by an astigmatic optical element, according to example embodiments.

Alternatively, the same light emitter could be used to project substantially linear illumination patterns that scan an angular range that lies in the vertical/depth plane (axes indicated in FIG. 7b). As illustrated in FIG. 7b, the light emitter is reoriented such that the individually addressable light-emitting elements 764 are arrayed along the vertical axis (axis indicated in FIG. 7b) on the circuit board 760. Additionally, the primary axis of the cylindrical lens 752 lies parallel to the horizontal axis.

Figure 8:
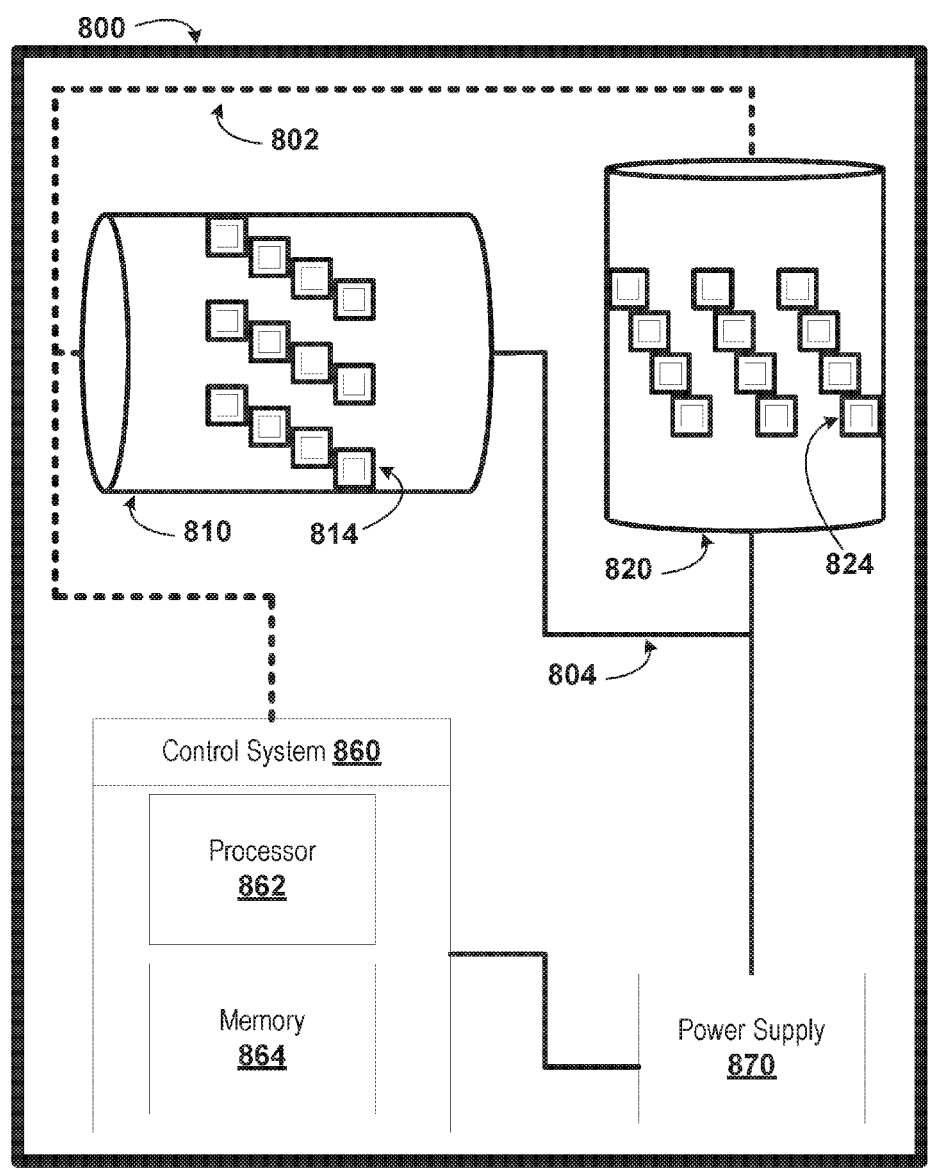
FIG. 8 is a block diagram of a horizontal and vertical projector, according to example embodiments.

In addition, if the two emitter configurations presented in FIGS. 7a and 7b were two separate emitters, they could simultaneously scan orthogonal angular ranges. Further, the two separate emitters could be placed on a single circuit board to scan an environment, as illustrated in FIG. 8.

As discussed above, in some embodiments of a light emitter (e.g., the light emitter 800 illustrated in FIG. 8), there may be a first array of staggered individually addressable light-emitting elements 814 disposed behind a first cylindrical lens 810 on the same circuit board as a second array of staggered individually addressable light-emitting elements 824 disposed behind a second cylindrical lens 820. The first and second arrays could be oriented such that the arrays emit respective patterns of illumination in first and second directions, respectively, such that the first and second directions are rotated relative to each other (e.g., such that the first and second directions are substantially orthogonal, that is, such that the first and second directions differ by between 80 degrees and 100 degrees). This could allow a light detector to determine the angle of the object relative to the light emitter in two orthogonal directions. In another example, the two arrays of the light emitter could be located at different locations in the environment, and determining the location of the object based on the illumination received by the object from the two arrays could include determining that the object is located on a particular plane or line within the environment based on the detected illumination and also based on the relative locations and orientations of the two arrays within the environment. Furthermore, in other embodiments, three or more arrays of individually addressable light-emitting elements with three or more astigmatic optical elements could be employed across one or more light emitters.

Illumination received by an object (e.g., by a light detector of the object) from two (or more) different arrays and/or light emitters could be detected in a variety of ways. In an example embodiment, the different arrays could emit patterns of illumination during different respective periods of time. In such an example, detecting the illumination from the two different arrays could include operating a light detector of the object to detect light received by the object during the different respective periods of time. In another example, the different arrays could emit illumination at different respective wavelengths and detecting the illumination from the two different arrays could include operating multiple light detectors (e.g., light detectors coupled to respective wavelength-selective filters corresponding to the different wavelengths of the light emitted by the light emitters) of the object to detect light incident on the object at the different respective wavelengths. In yet another example, the illumination emitted from each of the arrays could be modulated at a different respective frequency, and detecting the illumination from the two different light emitters could include filtering a light intensity signal detected using a light detector of the object at the different respective frequencies. Additional or alternative methods of detecting the intensity over time of light received by an object from two or more arrays as described herein are anticipated by the inventors.

Furthermore, the cylindrical lenses 810/820 and the corresponding arrays of individually addressable light-emitting elements 814/824 could be packaged onto a circuit board 800. The circuit board 800 may include communication interconnects 802 for transmitting modulation signals to the individually addressable light-emitting elements 814/824 from a control system 860 (e.g., a control system 860 that includes a processor 862 configured to execute instructions stored on a memory 864 to generate illumination patterns to scan an environment). The circuit board 800 may also include power interconnects 802 that provide a supply voltage to the individually addressable light-emitting elements 814/824 from a power supply 870. The power supply 870 may include batteries or ultra-capacitors, in some embodiments. In alternate embodiments, the power supply 870 may include a plug configured to connect to a wall socket and an alternating current to direct current (AC to DC) converter.

Figure 9A:
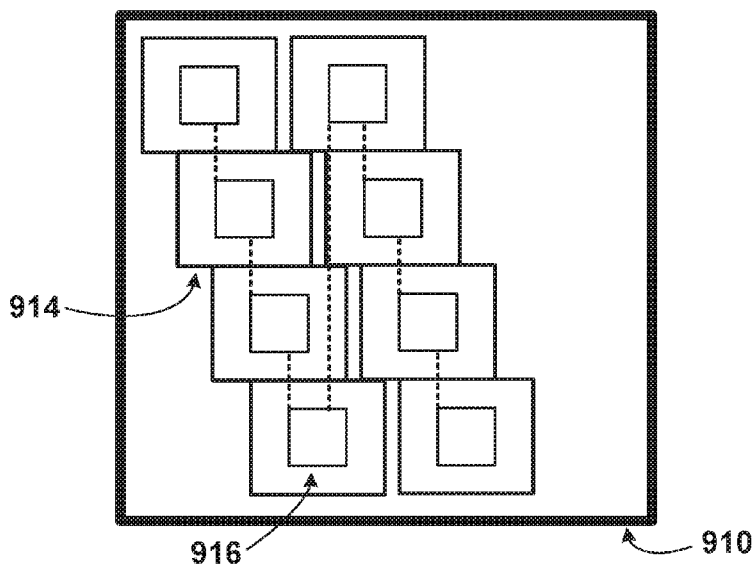
FIG. 9*a* is a front view of a staggered array of individually addressable light-emitting elements, according to example embodiments.
Figure 9B:
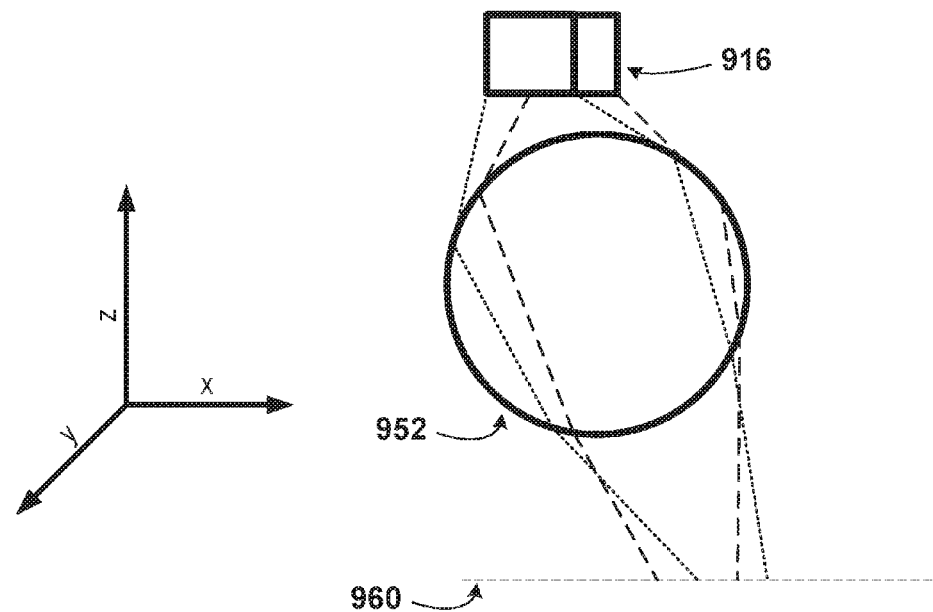
FIG. 9*b* is a top view of light from a staggered array of individually addressable light-emitting elements being focused by an astigmatic optical element, according to example embodiments.

Similar to the embodiment illustrated in FIG. 5, individually addressable light-emitting elements may be staggered within an array. Illustrated in FIG. 9a, the individually addressable light-emitting elements 914 are staggered with respect to one another in an array on a circuit board 910 such that their corresponding projecting surfaces 916 overlap with one another in a primary direction (e.g., horizontally). As illustrated in FIG. 9b (a top view illustration), when light is emitted from adjacent individually addressable light-emitting elements 914 through a cylindrical lens 952, rather than projecting coterminous substantially linear illumination patterns (as in the embodiment of FIG. 5), overlapping substantially linear illumination patterns are projected onto a vertical/horizontal plane 960 within an environment. This effect is illustrated by the two pairs of dashed lines. A design such as this may be used to enhance the intensity output at certain locations within an environment, for example. Additionally, such an overlapping design may be alternated with the aligned design illustrated in FIG. 5 to achieve regions of differing illumination intensity within an environment.

III. EXAMPLE METHODS

Figure 10:
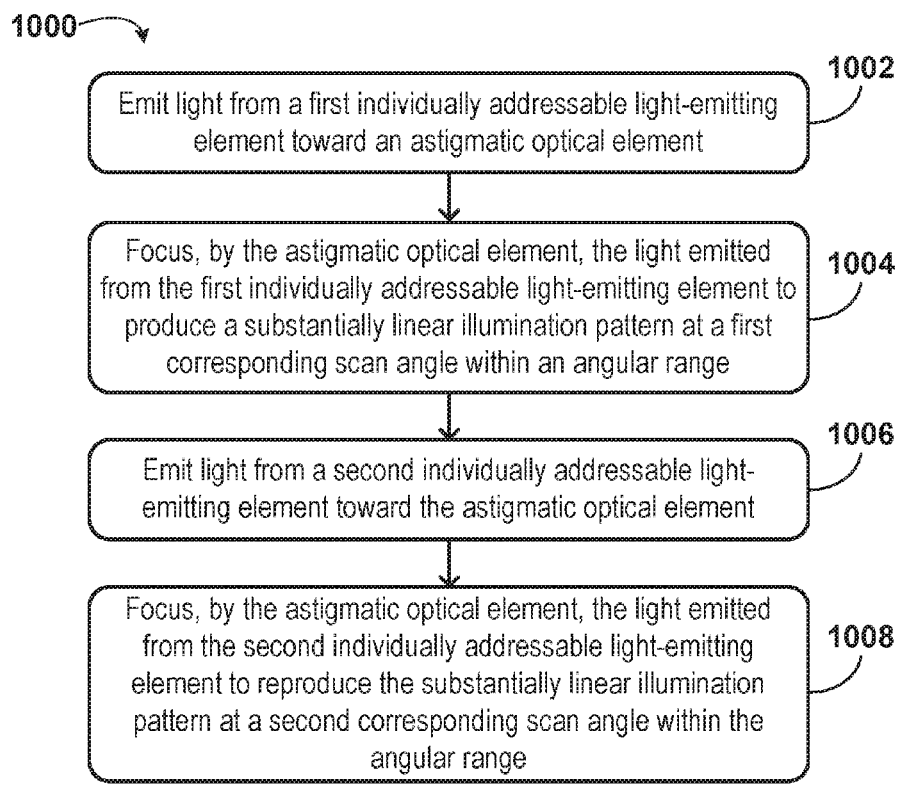
FIG. 10 is a flowchart of a method, according to example embodiments.

FIG. 10 is a flowchart of a method 1000 for operating a light emitter to produce patterns of illumination as described elsewhere herein. Such patterns of illumination can be provided, during respective periods of time, to facilitate determining the location of objects, in a first direction relative to the light emitter, based on illumination received by the objects over time from the light emitter. The patterns of illumination are specified to spatially encode the environment of the light emitter such that different regions of the environment (e.g., different ranges of angles in the first direction, relative to the light emitter) receive different time-varying patterns of illumination from the light emitter. Such a time-varying pattern can be detected and used to determine which of the regions of the environment the time-varying pattern was detected from, and thus to determine the location (e.g., the angle in the first direction) of a light detector or other apparatus used to detect the time-varying pattern with respect to the light emitter.

The light emitter includes a number of sets of one or more interconnected individually addressable light-emitting elements that are disposed in an array of the light emitter and that each correspond to a respective one of the patterns of illumination emitted from the light emitter. The array is disposed relative to an astigmatic optical element of the light emitter such that, when a particular set of one or more interconnected individually addressable light-emitting elements of the array is operated to emit light, the emitted light is focused by the astigmatic optical element to produce a corresponding one of the patterns of illumination from the light emitter.

At block 1002, the method 1000 includes emitting light from a first individually addressable light-emitting element toward an astigmatic optical element. Block 1002 could include providing a voltage difference across the first individually addressable light-emitting element, in some embodiments. Further, the light emitted from the first individually addressable light-emitting element could be at a corresponding intensity and/or a corresponding wavelength determined by a control system, for example. The corresponding intensity and/or the corresponding wavelength could be based on a location within an environment to which the emitted light will be directed (e.g., the emitted light directed toward the center of an angular range of the environment could have a greater intensity than emitted light directed toward the edges of the angular range).

At block 1004, the method 1000 includes focusing, by the astigmatic optical element, the light emitted from the first individually addressable light-emitting element to produce a substantially linear illumination pattern at a first corresponding scan angle within an angular range. Block 1004 may include focusing the light emitted by the first individually addressable light-emitting element in one direction (e.g., horizontally) and spreading the light in an orthogonal direction (e.g., vertically). In order to accomplish this, the astigmatic optical element could be a cylindrical lens, in some embodiments.

The substantially linear illumination pattern may extend in one dimension (e.g., vertically) across a dimension of the environment (e.g., a wall within a room). The width of the first corresponding scan angle within the angular range may correlate to the width of a projecting surface on the first individually addressable light-emitting element. Alternatively, the width of the first corresponding scan angle within the angular range may correlate to physical characteristics of the light emitted by the first individually addressable light-emitting element (e.g., beam waist of a laser beam or diffraction limit of the wavelength emitted by the first individually addressable light-emitting element).

At block 1006, the method 1000 includes emitting light from a second individually addressable light-emitting element toward the astigmatic optical element. Similar to block 1002, the light emitted from the second individually addressable light-emitting element could be at a corresponding intensity and/or a corresponding wavelength. The corresponding intensity and/or corresponding wavelength may correlate to a given location within the environment toward which the light emitted by the second individually addressable light-emitting element will be projected.

In some embodiments, the second individually addressable light-emitting element could be disposed immediately adjacent to the first individually addressable light-emitting element, within an array, for example. Furthermore, the first and the second individually addressable light-emitting elements could both be located on a circuit board. The first and the second individually addressable light-emitting elements could further be staggered with respect to one another such that a first projecting surface on the first individually addressable light-emitting element and a second projecting surface on the second individually addressable light-emitting element are aligned with one another.

At block 1008, the method 1000 includes focusing, by the astigmatic optical element, the light emitted from the second individually addressable, light-emitting element to reproduce the substantially linear illumination pattern at a second corresponding scan angle within an angular range. Similar to block 1004, focusing could include focusing the light in one direction (e.g., horizontally), and spreading the light in an orthogonal direction (e.g., vertically). The reproduced substantially linear illumination pattern could be projected on a portion of the environment that lies immediately adjacent to the substantially linear illumination pattern projected by block 1004, for example. This may occur if the respective first and second projecting surfaces of the first and second individually addressable light-emitting elements are aligned.

The method 1000 could include further steps, wherein further patterns of illumination are generated, during respective periods of time, from the light emitter by generating light from respective further sets of one or more interconnected individually addressable light-emitting elements of the light emitter. Such further patterns of illumination could be provided to increase a resolution to which the location of a light detector or other object in the environment can be determined (e.g., by providing patterns of illumination that provide illumination selectively to smaller portions of the environment).

Further, the method 1000 could include a step providing illumination, during a particular one or more periods of time, to all of the first range of angles (e.g., to provide synchronization or timing information to light detectors or other objects receiving such illumination). The method 1000 could additionally include providing, via one or more provided patterns of illumination, optical transmissions of information to light detectors in the environment. Still further, the method 1000 could include providing, via radio frequency transmissions, information about the timing, sequence, angles of an environment illuminated, or other information about patterns of illumination provided, during respective different periods of time, from the light emitter. The method 1000 could include further steps, or steps alternative to those listed here.

Figure 11:
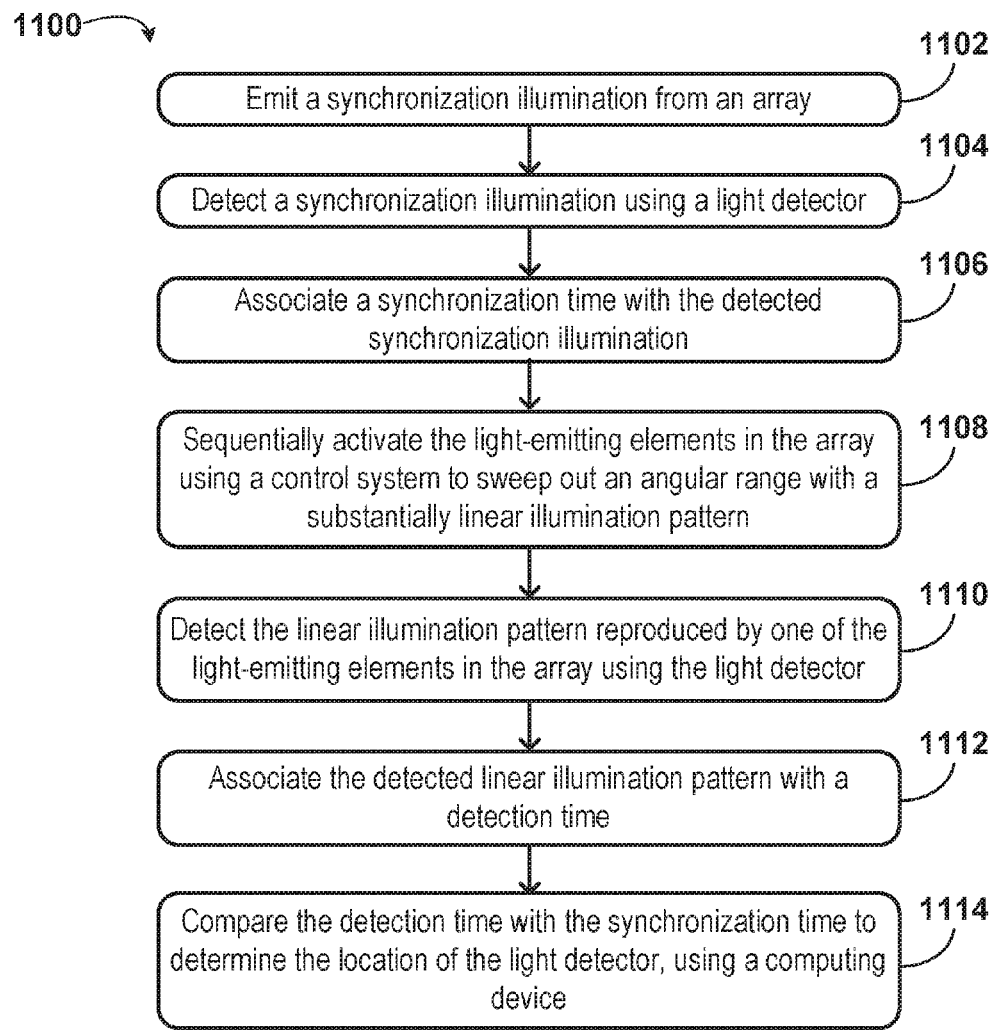
FIG. 11 is a flowchart of a method, according to example embodiments.

FIG. 11 is a flowchart of a method 1100 for illuminating an environment by a light emitter and detecting a location within the environment where an object (e.g., a light detector) is located. The light emitter and the object could comprise a location detection system. The patterns of illumination may be specified to spatially encode the environment of the light emitter such that different regions of the environment (e.g., different ranges of angles in the first direction, relative to the light emitter) receive different time-varying patterns of illumination from the light emitter. Furthermore, the light emitter and the object could communicate with each other in additional ways beyond the illumination and detection of illumination patterns within the environment.

The light emitter includes a number of sets of one or more interconnected individually addressable light-emitting elements that are disposed in an array of the light emitter and that each correspond to a respective one of the substantially linear illumination patterns emitted from the light emitter. The array is disposed relative to an astigmatic optical element of the light emitter such that, when a particular set of one or more interconnected individually addressable light-emitting elements of the array is operated to emit light, the emitted light interacts with the astigmatic optical element to produce a corresponding one of the substantially linear illumination pattern from the light emitter.

At block 1102, the method 1100 includes emitting a synchronization illumination from an array. Block 1102 may include illuminating a plurality of individually addressable light-emitting elements within the array (e.g., all of the individually addressable light-emitting elements within the array). Further, the plurality of individually addressable light-emitting elements within the array could emit light in a series of pulses, modulated at a corresponding synchronization frequency, intensity, and/or pattern. The corresponding synchronization frequency, intensity, and/or pattern could be recognizable by one or more light detectors, for example, as a way of determining that the illumination provided by the individually addressable light-emitting elements in the array in block 1102 is a synchronization illumination.

At block 1104, the method 1100 includes detecting the synchronization illumination using a light detector. The light detector could be disposed at a particular location within an environment. As described above, the light detector could include a controller, such as a processor executing instructions stored within a memory, for example. Furthermore, the light detector could include a photodiode, a phototransistor, a photoresistive element, or some other component(s) configured to output a voltage, a current, or some other electrical signal related to the intensity, wavelength, or other properties of the received light. In some embodiments of method 1100, block 1104 could include detecting the synchronization illumination from a plurality of light detectors. For example, an object within the environment may have multiple light detectors positioned at different locations on the object (e.g., a light detector on the left arm and another light detector on the right arm of a person).

Further, detecting the synchronization illumination could include detecting a corresponding wavelength, intensity, and/or duration of illumination. Additionally, detecting the synchronization illumination could include detecting a wavelength and/or intensity profile with respect to time. Detecting such a profile could allow the light detector to more precisely pinpoint the angular position of the light detector within the environment.

At block 1106, the method 1100 includes associating a synchronization time with the detected synchronization illumination. Block 1106 could include a transceiver associated with the light detector accessing a network (e.g., the public Internet) to determine the current time. Alternatively, the light detector could have an internal clock that stores the current time. Block 1106 may also include storing the associated synchronization time in a memory. The memory could be located on-board the light detector, in some embodiments. Alternatively, the memory could be located remotely (e.g., a cloud storage device to which the light detector communicates the synchronization time).

At block 1108, the method 1100 includes sequentially illuminating the individually addressable light-emitting elements in the array using a control system to sweep out an angular range with a substantially linear illumination pattern. In some embodiments, block 1108 may include illuminating different individually addressable light-emitting elements for different amounts of time. For example, the first individually addressable light-emitting element in the array could be activated for 500 milliseconds, and each successive individually addressable light-emitting element could be activated for 5 fewer milliseconds, consecutively. Such an illumination scheme could allow one or more light detectors to detect their respective angular positions relative to the light emitter. In addition to a modulation in time, a modulation in wavelength (e.g., each of the individually addressable light-emitting elements emits a slightly different wavelength of light) could be used during the sequential illumination of the individually addressable light-emitting elements in the array.

At block 1110, the method 1100 includes detecting the substantially linear illumination pattern reproduced by one of the light-emitting elements in the array using the light detector. Similarly to block 1104, detecting the substantially linear illumination pattern could include detecting a corresponding wavelength, intensity, and/or duration of illumination. Further, detecting the substantially linear illumination pattern could include detecting a wavelength and/or intensity profile with respect to time. Detecting such a profile could allow the light detector to more precisely pinpoint the angular position of the light detector within the environment.

At block 1112, the method 1100 includes associating the detected substantially linear illumination pattern with a detection time. If a wavelength and/or intensity profile were detected with respect to time, block 1112 could include associating the substantially linear illumination pattern with a set of detection times. Analogously to block 1106, block 1108 could include a transceiver associated with the light detector accessing a network (e.g., the public Internet) to determine the current time. Alternatively, the light detector could have an internal clock that stores the current time.

Block 1108 may also include storing the associated detection time in a memory. The memory could be located on-board the light detector, in some embodiments. Alternatively, the memory could be located remotely (e.g., a cloud storage device to which the light detector communicates the synchronization time).

At block 1114, the method 1100 includes comparing the detection time with the synchronization time to determine the angular position of the light detector, using a computing device. The computing device could be located on-board the light detector, in some embodiments. In alternate embodiments, the computing device could be a central server, for example, that determines the angular positions of multiple light detectors based on multiple respective detection times and synchronization times. The computing device, in such embodiments, may communicate with the light detector through a transceiver on the light detector, for example. Block 1114 may include the computing device subtracting the synchronization time from the detection time to determine a time duration between when the synchronization illumination was detected and when the substantially linear illumination pattern was detected. Further, block 1114 may include the computing device dividing the time duration between the synchronization illumination detection and the substantially linear illumination pattern detection by an illumination time of each of the individually addressable light-emitting elements in the emitter to determine the angular position of the light detector. The illumination time of each of the individually addressable light-emitting elements may have previously been transmitted from the light emitter to the light detector. Additionally or alternatively, the illumination time may have been generated/altered based on information contained within the synchronization illumination (e.g., the wavelength of the synchronization illumination serves as an indication from the light emitter to the light detector as to the illumination time of each of the individually addressable light-emitting elements that is used in the corresponding illumination sequence).

The method 1100 could include further steps, wherein further patterns of illumination are generated, during respective periods of time, from the light emitter by generating light from respective further sets of one or more interconnected individually addressable light-emitting elements of the light emitter. Such further patterns of illumination could be provided to increase a resolution to which the angular position of a light detector or other object in the environment can be determined (e.g., by providing patterns of illumination that provide illumination selectively to smaller portions of the environment).

The method 1100 could additionally include providing, via one or more provided patterns of illumination, optical transmissions of information to light detectors in the environment. Still further, the method 1100 could include providing, via radio frequency transmissions, information about the timing, sequence, angles of an environment illuminated, or other information about patterns of illumination provided, during respective different periods of time, from the light emitter. The method 1100 could include further steps, or steps alternative to those listed here.

IV. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

What is claimed is:

1. A device comprising:
    an astigmatic optical element;
    an array of individually addressable light-emitting elements arranged to emit light towards the astigmatic optical element, wherein the astigmatic optical element is arranged to focus light emitted from each individually addressable light-emitting element to produce a substantially linear illumination pattern at a different corresponding scan angle within an angular range; and
    a control system operable to sequentially activate the individually addressable light-emitting elements such that the substantially linear illumination pattern sweeps out the angular range,
    wherein the individually addressable light-emitting elements are staggered with respect to one another in the array such that the substantially linear illumination pattern sweeps out the angular range contiguously.

2. The device of claim 1, wherein the substantially linear illumination pattern sweeping out the angular range contiguously is used to scan a physical space horizontally.

3. The device of claim 1, wherein the substantially linear illumination pattern sweeping out the angular range contiguously is used to scan a physical space vertically.

4. The device of claim 1, wherein the array is fabricated on a printed circuit board.

5. The device of claim 1, wherein the array contains thirty-two individually addressable light-emitting elements.

6. The device of claim 1, wherein the number of individually addressable light-emitting elements in the array contributes to an angular resolution of the angular range.

7. The device of claim 1, wherein the number of individually addressable light-emitting elements in the array contributes to a size of the angular range.

8. The device of claim 1, wherein a width of the substantially linear illumination pattern focused from one of the individually addressable light-emitting elements is such that the substantially linear illumination pattern would at least partially overlap the substantially linear illumination pattern focused from an adjacent individually addressable light-emitting element.

9. The device of claim 1, wherein the astigmatic optical element is a cylindrical lens.

10. The device of claim 1, wherein the angular range is ninety degrees.

11. A method comprising:
    emitting light from a first individually addressable light-emitting element toward an astigmatic optical element;
    focusing, by the astigmatic optical element, the light emitted from the first individually addressable light-emitting element to produce a substantially linear illumination pattern at a first corresponding scan angle within an angular range;

emitting light from a second individually addressable light-emitting element toward the astigmatic optical element; and focusing, by the astigmatic optical element, the light emitted from the second individually addressable light-emitting element to reproduce the substantially linear illumination pattern at a second corresponding scan angle within the angular range, wherein the first individually addressable light-emitting element and the second individually addressable light-emitting element are in an array of individually addressable light-emitting elements, wherein the first individually addressable light-emitting element and the second individually addressable light-emitting element are sequentially activated by a control system such that the substantially linear illumination pattern sweeps out at least a portion of the angular range, and wherein the first individually addressable light-emitting element and the second individually addressable light-emitting element are staggered with respect to one another in the array such that the substantially linear illumination pattern sweeps out the angular range contiguously.

12. The method of claim 11, wherein a width of the substantially linear illumination pattern focused from the first individually addressable light-emitting element at least partially overlaps the substantially linear illumination pattern focused from the second individually addressable light-emitting element.

13. The method of claim 11, wherein the array is fabricated on a printed circuit board.

14. The method of claim 11, further comprising:
detecting, by a light detector, the light emitted from the first individually addressable light-emitting element or from the second individually addressable light-emitting element; and
associating the detected light emitted from the first individually addressable light-emitting element or the second individually addressable light-emitting element with a detection time.

15. The method of claim 14, further comprising:
emitting, simultaneously, light from both the first and the second individually addressable light-emitting elements to generate a synchronization illumination;
focusing, by the astigmatic optical element, the light emitted from both the first individually addressable light-emitting element and the second individually addressable light-emitting element;
detecting, by the light detector, the synchronization illumination;
associating the detected synchronization illumination with a synchronization time; and
comparing, by a computing device, the detection time with the synchronization time to determine an angular position of the light detector.

16. The method of claim 11, further comprising:
emitting, simultaneously, light from both the first and the second individually addressable light-emitting elements to generate a synchronization illumination; and
focusing, by the astigmatic optical element, the light emitted from both the first and the second individually addressable light-emitting elements.

17. The method of claim 11, further comprising modulating, by the control system, a time interval between emitting light from the first individually addressable light-emitting element and emitting light from the second individually addressable light-emitting element.

18. The method of claim 11, wherein the light emitted from the first individually addressable light-emitting element and the light emitted from the second individually addressable light-emitting element are of different wavelengths.

19. The method of claim 11, wherein the first and the second individually addressable light-emitting elements are light emitting diodes (LEDs).

20. A system comprising:
a light-emitting device, wherein the light-emitting device comprises:
an astigmatic optical element;
an array of individually addressable light-emitting elements arranged to emit light towards the astigmatic optical element, wherein the astigmatic optical element is arranged to focus light emitted from each individually addressable light-emitting element to produce a substantially linear illumination pattern at a different corresponding scan angle within an angular range; and
a control system operable to sequentially activate the individually addressable light-emitting elements such that the substantially linear illumination pattern sweeps out the angular range,
wherein the individually addressable light-emitting elements are staggered with respect to one another in the array such that the substantially linear illumination pattern sweeps out the angular range contiguously; and
a light detector, wherein the light detector is configured to detect light emitted from the light-emitting device.

* * * * *